United States Patent [19]
Bustamante et al.

[11] Patent Number: 5,809,431
[45] Date of Patent: Sep. 15, 1998

[54] LOCAL MULTIPOINT DISTRIBUTION SYSTEM

[75] Inventors: Herman Bustamante, Danville; Horen Chen, Saratoga, both of Calif.

[73] Assignee: Stanford Telecommunications, Inc., Sunnyvale, Calif.

[21] Appl. No.: 574,605

[22] Filed: Dec. 6, 1995

[51] Int. Cl.$^6$ .............................. H04B 1/38; H04M 1/00
[52] U.S. Cl. ..................... 455/562; 455/425; 455/446; 455/63
[58] Field of Search .................. 455/33.1, 34.1, 455/54.1, 54.2, 86.1, 33.3, 562, 422, 425, 446, 449, 63, 69, 561

[56] References Cited

U.S. PATENT DOCUMENTS

| | | | |
|---|---|---|---|
| 5,265,119 | 11/1993 | Gilhousen et al. | 375/1 |
| 5,276,907 | 1/1994 | Meidan | 455/33.3 |
| 5,448,753 | 9/1995 | Ahl et al. | 455/31.1 |
| 5,585,850 | 12/1996 | Schwaller | 348/388 |

*Primary Examiner*—Nguyen Vo
*Assistant Examiner*—Darnell R. Armstrong
*Attorney, Agent, or Firm*—Jim Zegeer, ESQ.

[57] ABSTRACT

A local multipoint distribution system having a head end coupled to a plurality of base stations with each base station constituting a cell. Each base station has a plurality of sector beam antennas, each sector beam antenna illuminating a predetermined sector of the cell with RF communication signals. A plurality of RF subscriber stations for each sector of a cell, with each subscriber station having a high gain antenna with a narrow beam width oriented toward the sector beam antenna oriented toward its assigned sector. Time division multiple access control is provided at each subscriber station operated such that each subscriber transmits at a time different from the other subscribers in its sector so that the subscribers in a given sector do not interfere with each others' transmissions, respectively. The power level transmitted by the subscribers are adjusted or controlled so that the subscriber signals arrive at the respective base stations at about the same power level. The cells can be hexagonally shaped and the sectors arranged such that the subscribers do not radiate directly into the three db beam width of base stations of immediately adjacent cells. Alternatively, the cells can be rectangularly shaped and the sectors of the cells arranged such that the subscribers do not radiate directly into the three db beam width of base stations of immediately adjacent cells.

5 Claims, 23 Drawing Sheets

| PARAMETER | VALUE |
|---|---|
| 1. THREE, FOUR, SIX OR EIGHT SECTOR CELL DIVISION,& MORE CAN BE USED | 120°, 90°, 60°, OR 45° COVERAGE PER SECTOR RESPECTIVELY |
| 2. CELL DIMENSIONS | 2 KM RADIUS, COMMUNICATION RANGE, 1 KM TYPICALLY WITHIN THE CELL, AND 1 KM BEYOND THE NORMAL CELL BOUNDARY |
| 3. RAIN FADE | 7 dB/KM, 14 dB TOTAL |
| 4. FOLIAGE ATTENUATION | 10 dB TO 20 dB ASSUMED PER TREE. OVER COME BY USE OF BASE STATION DIVERSITY |
| 5. REQUIRED HUB TO SUBSCRIBER C/(NO+1) | 7 dB |
| 6. REQUIRED SUBSCRIBER TO HUB C/(NO+1) | 7 dB |
| 7. HUB ANTENNA GAIN | 13.5 dB, 15dB, 16.5dB, & 18dB FOR 120°, 90°, 60°, AND 45° COVERAGE, 3 dB BEAM WIDTHS RESPECTIVELY. |
| 8. SUBSCRIBER ANTENNA GAIN | 35 dB, 3.8 DEGREE, 3 dB BEAM WIDTH IN ALL CASES |
| 9. HUB TRANSMIT POWER | 1 W |
| 10. SUBSCRIBER TRANSMIT POWER | 100 mW TO 200 mW |
| 11. DOWN STREAM DATA RATE | 10 Mbps INITIALLY, 51 Mbps FUTURE REQUIREMENT |
| 12. UP STREAM DATA RATE | TI (1.024 Mbps) INITIALLY, 10Mbps TO 51 Mbps FUTURE REQUIREMENT |
| 13. DOWN STREAM FREQUENCY BAND | 27.5 GHz TO 28.35GHz, 850 MHz TOTAL |
| 14. UP STREAM FREQUENCY BAND | 29.1 GHz TO 29.25 GHz 150 MHz TOTAL |
| 15. SUBSCRIBER POPULATION PER CELL OF 1 KM RADIUS | 1000 TOTAL SUBSCRIBERS, 60% TO 85% TO BE SERVICED. POPULATION TO BE SERVICED CAN BE INCREASED BY INCREASED CELL SECTORIZATION AND THE USE OF POLARIZATION DIVERSITY. |
| 16. FREQUENCY RE-USE | FREQUENCY RE-USE OF 1 ACHIEVABLE WITHOUT POLARIZATION DIVERSITY WHEN USING THE OPTIMAL CELL CONFIGURATION FOR BOTH RECTANGULAR AND HEXAGONAL ARRAYS. FREQUENCY RE-USE OF 1 ACHIEVABLE WHEN OPERATING IN A DISADVANTAGED CELL ARRAY THROUGH THE USE OF POLARIZATION DIVERSITY. |
| 17. INTERFACE TO GEOGRAPHICALLY REMOTE CELLS | SATELLITE LINK BETWEEN HEAD END AND BASE STATION OF GEOGRAPHICALLY REMOTE CELLS CAN BE PROVIDED WITH A REDUCED REMOTE SYSTEM CAPACITY. |

FIG. 3a

| PARAMETER | VALUE |
|---|---|
| DOWN STREAM LINK | |
| 1) TOTAL BANDWIDTH ALLOCATED | 850MHz |
| 2) FREQUENCY RE-USE, SECTORS PER CELL | FREQUENCY RE-USE OF 1, 4 SECTORS/CELL |
| 3) DATA FORMAT | CONTINUOUS CARRIER TDMA |
| 4) NUMBER OF CARRIERS TOTAL & CARRIERS/SECTOR | 24 CARRIERS TOTAL, 6 CARRIERS/SECTOR |
| 5) CARRIER SPACING | 1/T = F = TRANSMITTED DATA RATE OF THE CHANNEL |
| 6) DATA RATE: PAYLOAD, TRANSMITTED | OC-1 (51.84 Mbps), 52.2 Mbps |
| 7) DATA MODULATION | QPSK |
| 8) DATA CODING | RATE 7/8 CONVOLUTIONAL ENCODING, INTERLEAVED, AND (60,54) REED SOLOMON CODING |
| 9) TRANSMIT CELL DATA STRUCTURE | 1 SYNC BYTE. 5 BYTE HEADER, 48 BYTE ATM PAYLOAD, 6 BYTE RS BITS |
| UP STREAM LINK | |
| 1) TOTAL BANDWIDTH ALLOCATED | 150 MHz |
| 2) FREQUENCY RE-USE, SECTORS PER CELL | 1 IN 4 FREQUENCY RE-USE, 4 SECTORS/CELL |
| 3) DATA FORMAT | BURST CARRIER, BYTE SYNCHRONOUS TDMA |
| 4) NUMBER OF CARRIERS TOTAL & CARRIERS/SECTOR | 8 CARRIERS TOTAL, 2 CARRIERS/SECTOR |
| 5) CARRIER SPACING | 2/F' = 2F', WHERE F' = TRANSMITTED DATA RATE OF THE CHANNEL |
| 6) DATA RATE | 1/2 OC-1 (25.92 Mbps), 26.1 Mbps |
| 7) DATA MODULATION | ALPHA = 0.25 ROOT-RAISED COSINE FILTERED QPSK |
| 8) DATA CODING | (60,54) REED SOLOMON CODING |
| 9) TRANSMIT CELL DATA STRUCTURE | 1 SYNC BYTE, 5 BYTE HEADER, 48 BYTE ATM PAYLOAD, 6 BYTE RS BITS, FOLLOWED BY A 1 BYTE GUARD SPACE |

FIG. 3b

| MESSAGE TYPE | SOURCE | DESTINATION | FUNCTION |
|---|---|---|---|
| INITIALIZATION REQUEST, FIGURE 14(a) | SUBSCRIBER | HEAD END | SUBSCRIBER ISSUES REQUEST FOR NET ENTRY FUNCTION TO BE INITIATED |
| INITIALIZATION RESPONSE, FIGURE 14 (d) | HEAD END | SUBSCRIBER | ISSUE INITIAL POWER, TIMING, AND FREQUENCY ADJUSTMENTS TO SUBSCRIBER, AND TRANSFER SUBSCRIBER OPERATIONS TO CHANNEL & SERVICES ASSIGNMENT REGION |
| TERMINATE REQUEST FIGURE 14 (a) | SUBSCRIBER | HEAD END | SUBSCRIBER ISSUES REQUEST FOR TERMINATION OF ONGOING SERVICES |
| TERMINATE COMMAND (a). FIGURE 14 (b) | HEAD END | SUBSCRIBER | HEAD END ISSUES COMMAND TO SUBSCRIBER TERMINATING ONGOING SERVICES AND ALL UP STREAM TRANSMISSIONS |
| TERMINATE COMMAND (b), FIGURE 14 (b) | HEAD END | SUBSCRIBER | HEAD END INDEPENDENTLY ISSUES COMMAND TO SUBSCRIBER TERMINATING ONGOING SERVICES AND ALL UP STREAM TRANSMISSIONS BECAUSE OF DEPICTED IMPROPER & REAL TIME UNCORRECTABLE SUBSCRIBER OPERATING CONDITIONS |
| SERVICE REQUEST, FIGURE 14 (c) | SUBSCRIBER | HEAD END | SUBSCRIBER IDENTIFICATION OF & REQUEST FOR INITIATION OF NEW SERVICES REQUIRED SERVICES |
| SERVICE REQUEST RESPONSE, FIGURE 14 (d) EXPANDED | HEAD END | SUBSCRIBER | CONTINUE REFINEMENT OF POWER, TIMING, AND FREQUENCY ADJUSTMENTS TO SUBSCRIBER, ISSUE DEFINITION OF SERVICES APPROVED FOR USE BY SUBSCRIBER AND TRANSFER SUBSCRIBER OPERATIONS TO ASSIGNED CELL REGION |
| STATUS REQUEST AND PARAMETER ADJUSTMENT COMMAND, FIGURE 14 (d) | HEAD END | SUBSCRIBER | HEAD END COMMAND TO SUBSCRIBER REQUESTING STATUS OF OPERATIONAL EQUIPMENT, & ALL IN-HOME MONITORING SERVICES, AND POWER, TIMING, & FREQUENCY ADJUSTMENT COMMANDS IF REQUIRED |
| REQUEST TO EXECUTE A FILE TRANSFER, FIGURE 14 (a) EXPANDED | SUBSCRIBER | HEAD END | THERE WILL BE TIMES THAT FILES OF DATA WILL BE TRANSFERRED FROM THE SUBSCRIBER TO THE HEAD END. THIS REQUEST DEFINES THE FILE DATA AND THE NEED TO INITIATE THIS OPERATION. |
| COMMAND TO PREPARE TO RECEIVE A DATA FILE. FIGURE 14 (b) EXPANDED | HEAD END | SUBSCRIBER | COMMAND TO SUBSCRIBER TO PREPARE FOR RECEPTION OF A DATA FILE, & DEFINITION OF HOW FILE WILL BE TRANSFERRED |

| Destination Address | Source Address | Message Type |
|---|---|---|
| 6 bytes | 6 bytes | 2 |

Figure 16b

| Destination Address | Source Address | Subscriber ID # | Message Type |
|---|---|---|---|
| 6 bytes | 6 bytes | 2 | 2 |

Figure 16c

| Destination Address | Source Address | Message Type | Service Type | Service Type | Service Type |
|---|---|---|---|---|---|
| 6 bytes | 6 bytes | 2 | 2 | 2 | 2 |

Figure 16d

| Destination Address | Source Address | Subscriber ID # | Message Type | Parameter Adjustments |
|---|---|---|---|---|
| 6 bytes | 6 bytes | 2 | 2 | 6 |

LOCAL MULTIPOINT DISTRIBUTION SYSTEM

BACKGROUND AND BRIEF DESCRIPTION OF THE INVENTION

The demand for greater quantities of information and data transfer to and from residential as well as business users continues to grow faster than supply can keep up with it. This information demand is being supplied in a variety of forms consisting of telephone systems of various forms, cable systems, hybrid fiber/cable systems, and wireless systems. This invention relates to a Local Multi-Point Distribution System (LMDS) intended to provide such services as broadcast video, video-on-demand, multimedia capability, interactive video, high speed data, telephony, and computer data links as examples. The system can provide a wireless interface from, for example, a local TELCO central office (CO), or a cable Head End office, in all cases, from a facility in a system defined as a "Head End" facility. FIG. I illustrates such a system. Note that the system consists of three basic components, i.e., a Head End facility, a system of Base Stations, and a multitude of system service Subscribers. The overall system is made up of a geographical structure of non-overlapping cells, wherein each geographical cell consists of some several hundred Subscribers all of whom are supported by one Base Station. Some number of Base Stations are all interfaced to a single Head End.

As shown in FIG. 1, the Head End collects all signals to be distributed throughout the system thereby forming a star configuration. The Head End at the center of the star, the Base Stations surround the Head End and the Subscribers surround the Base stations. As examples of signals collected, digital video may be gathered via satellite links, a telephone system interface may be provided via Class 5 switches, and high rate digital data networks may be interfaced via a high rate data switch. The data to/from the Head End is distributed to the system of local base stations each assigned to serve its geographical "cell" of subscribers.

While the description presented herein refers generally to a "micro cellular" system, which is defined as a system of cells of 5 km radius or less, the invention is equally applicable to a "macro cellular" system, herein defined as a system of cells of radius greater than 5 km.

The unique features embodied in the invention described herein include the following:

1) A micro cellular system of signal distribution for local multi-point distribution system (LMDS) application.

2) A micro cellular system of signal distribution with 100% frequency re-use of one with a four sector rectangular array of cells and with a six sector rectangular array of cells.

3) A micro cellular system of signal distribution with 100% frequency re-use of one with a four sector rectangular array of cells with a six sector rectangular array of cells incorporating the use of cross polarization isolation between sectors of adjacent cells operating at the same frequencies.

4) A micro cellular system of signal distribution with 200% frequency re-use of one with a four sector rectangular array of cells and with a six sector rectangular array of cells incorporating the use of cross polarization isolation between sectors of adjacent cells operating at the same frequencies, and operating with increased sectorization of the cells.

5) A micro cellular system of signal distribution with 100% frequency re-use of one with a four sector rectangular array of cells and with a six sector rectangular array of cells incorporating the use of intelligent frequency management between sectors of adjacent cells operating at the same frequencies.

6) A system capable of providing, for example, analog video broadcast, digital video in either broadcast or on-demand modes, interactive multimedia services, high rate digital data services, telephony, and in home monitoring systems such as might be employed for power meter reading or home security alarm systems.

7) A frequency reference technique whereby the Subscribers equipment is synchronized to the Base Station high stability sources and thereby minimize a) equipment implementation costs, b) signal acquisition times, and c) signal bandwidth overhead requirements to accommodate hardware frequency instability characteristics.

8) A closed loop Subscriber transmit power control technique whereby the Subscriber received power levels at the Base Station are all received at the same level thereby minimizing the possibility of any mutual interference between Subscriber signals, and eliminating the need for any significant AGC requirements in the Base Station RF receiving equipment.

9) A closed loop subscriber transmit timing control technique whereby the Subscriber received signal timing as received at the Base Station is adjusted by the Base Station in increments equal to the transmit signal symbol period to ensure the reception of all signals with a minimum of mutual interference from other Subscriber signals.

10) The optional use of antenna polarization diversity as a means of minimizing adjacent cell interference signals and increasing the total achievable capacity of the system.

11) A TDMA signaling structure which maximizes the transmit signaling format efficiency.

12) A signaling system operating within the ATM system specifications enabling an efficient utilization of system signaling capacity, as well as a highly flexible and adaptable signaling format allowing efficient redistribution of system bandwidth width in real time as the Subscriber data requirements change.

13) An order wire channel capability and signalling format which enable the entry and exit of Subscribers easily and efficiently in real time as the Subscriber needs and Subscriber population changes.

14) An order wire channel capability and signalling format which easily and efficiently accommodates real time Subscriber requests for changes in the services required, additions to the services required, and the execution of control functions to the services being provided, e.g., "VCR" like controls to a video being viewed such as the "pause" function.

15) A frequency plan which on the Down Stream provides orthogonal OC-1 channels spaced at F frequency steps where F is the transmission data rate of the Down Stream channel, and on the Up Stream provides ½ OC-1 channels spaced at F' hwere 2F'=F.

16) The optional use of a two-way satellite link interface front the Head End to the Base Station of a cell which is geographically remote from the central cell system.

17) The incorporation of maximally efficient burst modem techniques thereby enabling reception of multiple mutually asynchronous time multiplexed signals each emanating from different transmitting sources by a single receiver thereby simplifying the design and cost of both the transmitting and receiving equipment.

18) The use of asynchronous transfer mode over a wireless medium for high speed data delivery incorporating the implementation of a highly efficient transmit data frame format which partitions the frame into five different types of data and containing the following characteristics and attributes:

a) A medium access control method employing time division multiplexing on the down stream and time-division multiple access on the up stream and where the up stream frame timing is synchronized to the down stream frame timing;

b) Use of a frame start ATM cell on the down stream as a synchronization mechanism for the up stream frame timing;

c) Use of a region of the up stream frame consisting of a group of contiguous net entry slots for asynchronous access by new subscribers entering the network after power on;

d) Use of a region of the up stream frame consisting of a group of contiguous slots for random access transmissions of subscriber service requests;

e) Use of a portion of the up stream frame for polling of Subscribers for the purpose of gathering power meter data, home security alarm monitoring, and health, status data on the operational system hardware;

f) Use of a remainder of the frame for the communication of data in the ATM mode.

DESCRIPTION OF THE DRAWINGS

The above and other objects, advantages and features of the invention will become more apparent when considered with the following description taken in conjunction with the accompanying drawings, wherein:

FIG. 3(a) is Table 1 of typical parameters, and FIG. 3(b) is Table 2 of typical Baseline Communication Link parameters, FIG. 15 is Table 3 which is a chart of typical control and data messages, FIGS. 16(a) to 16(d) illustrate typical message formats to be used in Up Stream and Down Stream communications.

DETAILED DESCRIPTION OF THE INVENTION

Figure 1:
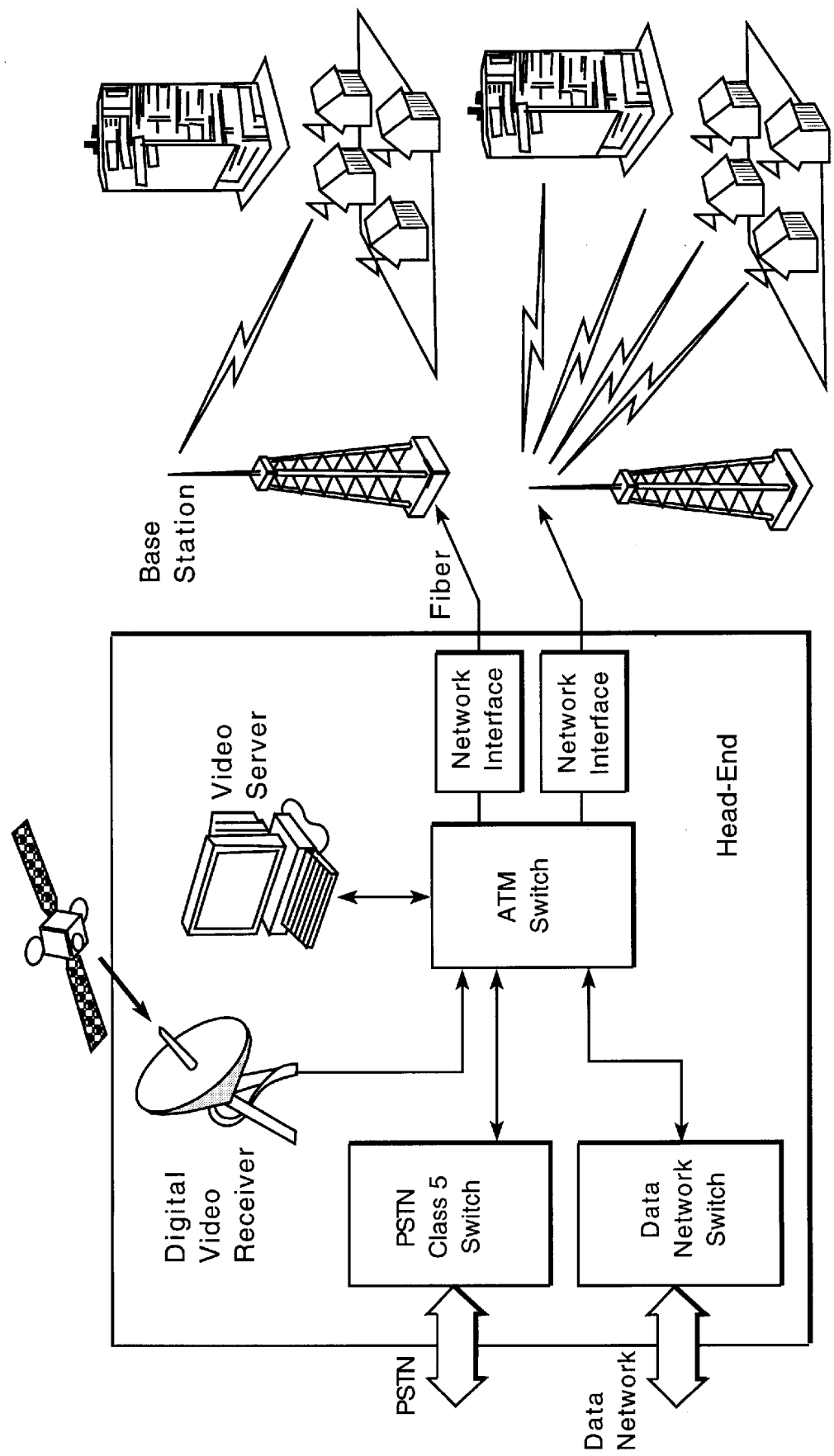
FIG. 1 is a schematic block diagram of a Local Multipoint Distribution System (LMDS) incorporating the invention.

A typical LMDS system configuration was shown in FIG. 1, wherein a Head End facility HEF is shown collecting signals and data from three exemplary sources in this case. These exemplary sources are one from a satellite down link input 10, one from a two-way public telephone system network interface 11, and one from a two-way data network interface 12. The system forms a star network communicating signal to/from the head end to a system of base stations BS-1 . . . BS-N, each of which services a geographical cell of subscribers s1-1, s1-2 . . . s1-n, sn-1, sn-2 . . . sn-n communicating and receiving a host of services which may include such data as:

1) Analog video broadcast signals

2) Digital video with Distribution operating in either broadcast or on-demand modes with remote control capability of the video display as when controlling a VCR when operating in the on-demand mode.

3) Delivery of MPEG-2 encoded digital video consisting of either cable television programming or programming from a video server delivered on an on-demand basis.

4) High rate digital data services including interactive multimedia service, World Wide Web access, file transfer protocol, and electronic mail.

5) Desk top and full screen video conferencing.

6) Two way telephony including plain-old telephone service (POTS) with single or multi-line capability, T1 access, and basic rate and primary rate ISDN services.

7) Interactive multimedia and games using both computers and game players such as Sega or Nintendo.

9) Remote in-home monitoring services such as might be employed for power meter reading or home security alarm services, and operational system hardware health and status monitoring.

Cellular System Configurations

Many different cellular system configurations can be used with the system of this invention. The two configurations discussed herein are rectangular arrays of cells and hexagonal arrays of cells. It will be shown that a 100% frequency re-use of one can be achieved in several ways with both types of arrays. It will also be shown that the capacity of the system can be easily doubled by proper selection of frequency assignment plans within the array, combined with increased sectorization of the cells of the array. In addition, it will also be shown that in some disadvantaged cell arrays the 100% frequency re-use of one can still be achieved by incorporating polarization diversity in the signals transmitted by adjacent cells.

Figure 2:
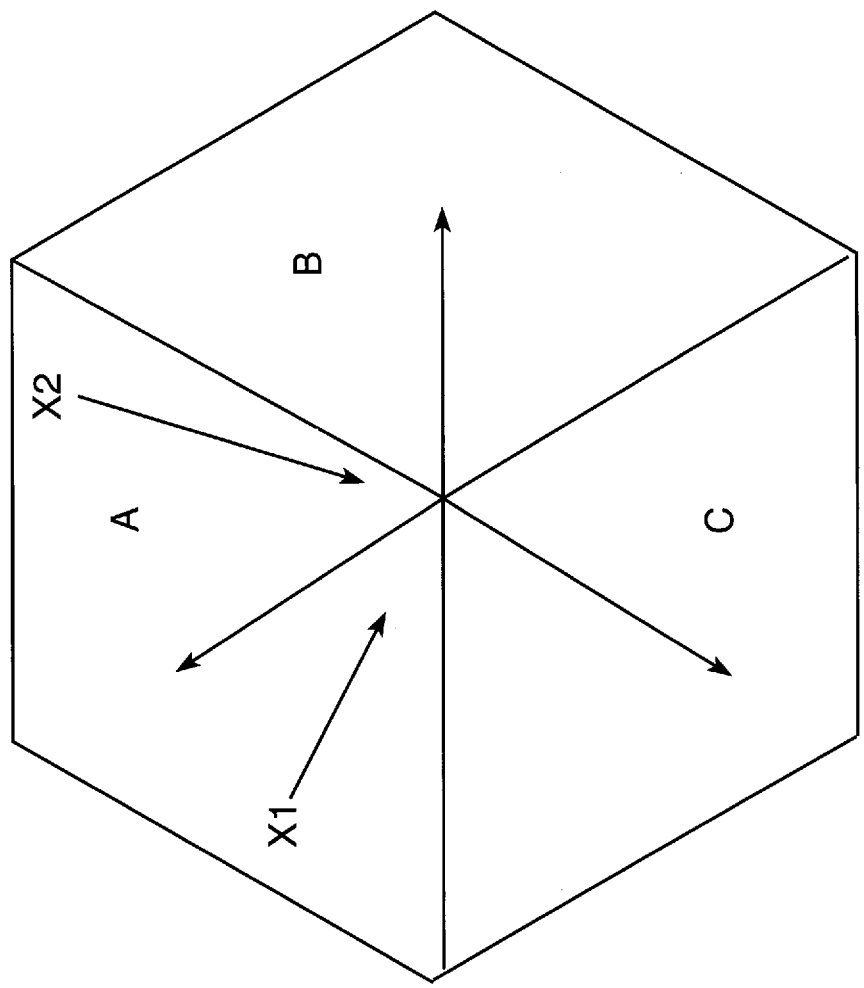
FIG. 2 is a diagrammatic representation of a hexagonal, three sector cell pattern incorporating the invention.

A typical cellular system configuration is illustrated in FIG. 2. A simple single hexagonal cell is shown in bold outline. The cell has three 120 degree sectors labeled A, B, and C. The cell Base Station is located at the center of the cell. In this case the Base Station is supplied with three 120 degree sector beam antennas AA, AB, and AC, each sector beam antenna illuminating one of the sectors in the direction indicated by the arrows pointing out from the center away from the Base Stations and into sectors A, B, and C. Note that sector A antenna AA does not illuminate sectors B nor C. Similarly sector B antenna AB does not illuminate sectors A nor C, and sector C antenna AC does not illuminate sectors A nor B. Each Base Station supports a system of Subscribers all of whom will typically lie within its sector of service. Two such subscribers are shown for sector A as X1, and X2. Subscribers are typically provided with relatively high gain antennas with narrow beam widths. A typical set of overall system parameters are identified in Table 1 (FIG. 3a). A set of baseline communication link parameters is shown in Table 2 (FIG. 3b). The Subscriber's narrow beam antennas are pointed directly at the Base Station as indicated by the arrows emanating from X1 and X2 aimed at the center of the cell where the Base Station is located. The narrow beam antennas provide the effect of almost eliminating the possibility of multipath interference.

The direction of transmission from the Base Station to the Subscribers is referred to herein as the "down stream" direction, whereas the direction of transmission from the Subscribers to the Base Station is herein referred to as the "up stream" direction. Note from Table I (FIG. 3) that, as defined by the Federal Communications Commission (FCC) there are 850 MHz allocated for the down stream traffic, and 150 MHz allocated for the up stream traffic. This total allocated bandwidth is to be divided equally among the various sectors, however many there are for the particular cell structure chosen, in this example three. Thus, sectors A, B, and C operate using different and equal portions (⅓ each) non-overlapping portions of the total allocated system bandwidth.

Figure 4B:
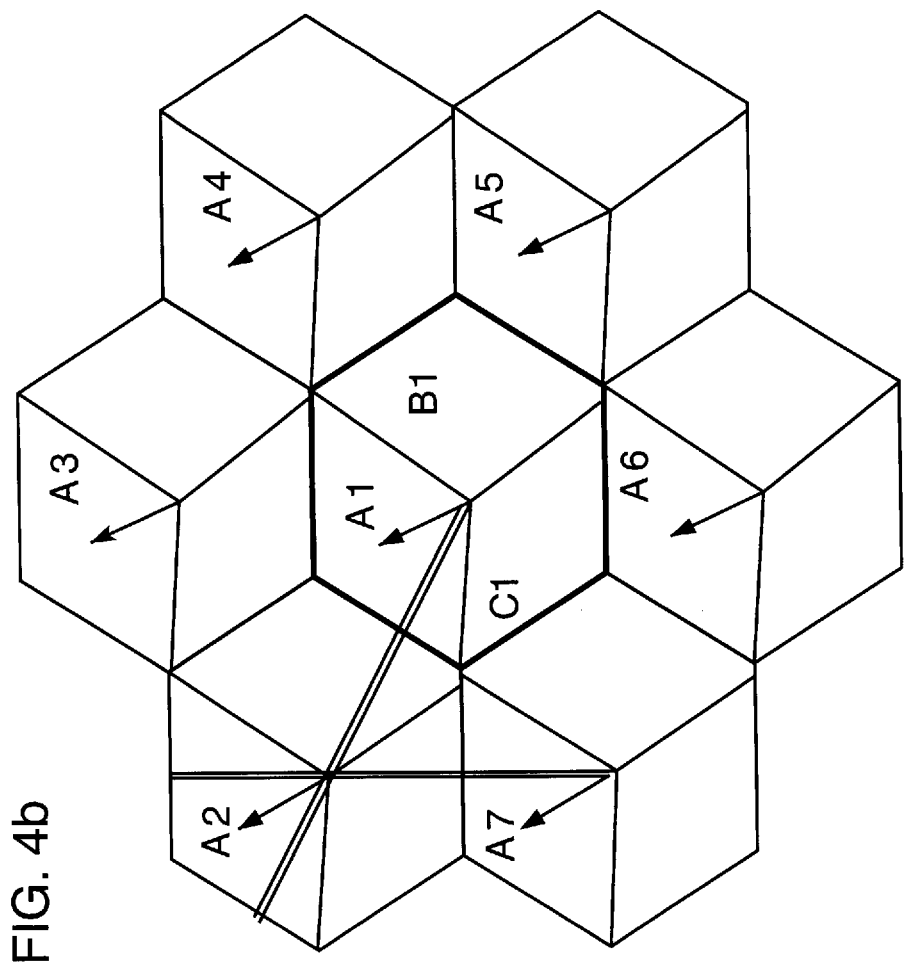
FIG. 4(b) is a typical hexagonal seven cell, three sector pattern.
Figure 4A:
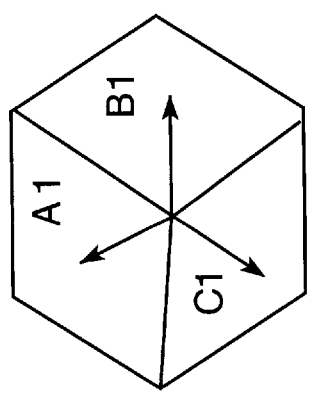
FIG. 4(a) is a diagrammatical representation of a typical hexagonal, single, three sector cell pattern.

FIG. 4 shows a system of seven cells. The single cell pattern as shown in FIG. 2 is repeated in FIG. 4(a). The seven cell pattern repeats the single cell configuration identically in every cell. The cells are differentiated only by the numerical labels placed on them here wherein all the sectors in cell 1 are identified by a 1 attached to its label.

Similarly a 2 is attached to its label if it is in cell 2, a 3 is attached to its label if it is in cell 3, and so on for all the cells. Note however that all sectors labeled A operate on the same assigned frequency bands, all the sectors labeled B operate on their same assigned frequency bands, and all the sectors labeled C operate on their same assigned frequency bands. This suggests that mutual interference may occur between Base Stations and Subscribers in sectors of adjacent cells operating in the same frequency bands. This problem is eliminated as described below.

Subscriber Transmit Power Control and Adjacent Cell Interference Signals

In one embodiment, all transmission will be communicated in a TDMA format. The down stream transmitted power level for all signals from the Base Station will be adjusted to provide the proper receive signal level to the Subscribers at the maximum range. The up stream transmitted power levels originate from all the many Subscribers in the cell. These Subscribers will transmit at different assigned times so as to not interfere with each others transmissions. The transmitted power level from all Subscribers will be maintained at a level such that all Subscriber signals arrive at their respective Base Stations at approximately the same operating level. This further minimizes the possibility of mutual interference between Subscribers in the same cell.

Subscribers and Base Stations in one cell will generate signals in the same frequency band and at the same assigned time slots of Subscribers and Base Stations of sectors of adjacent cells assigned to use those same frequencies and time slots. Thus, there are two primary possible sources of interference in the system. The Subscribers of one cell can transmit interference signals into the Base Station of an adjacent cell operating at the same frequency, or a Base Station can transmit interference into the Subscribers of an adjacent cell operating in the same frequency band. For example the Subscribers of sector A2 in cell 2 can illuminate the Base Station of sector A in cell 1 or cell 7. The Base Station of sector Al in cell 1 can illuminate the Subscribers in sector A of cells 2 and 3.

Consider the first situation. The Subscribers in sector A2 of cell 2 have their narrow beam antennas all pointed at the Base Station of sector A2 cell 2. This being the case, and considering the fact that the Subscriber antenna 3 dB beam width is only 3.8 degrees, its antenna cannot be radiating into the A sector Base Stations of cells 1 or 7 unless the Subscribers lie within the 3.8° segment centered along the double lines drawn through sector A2 and A7, and through sector A2 and A1. In addition a 3.80° segment of the cell 2 Subscribers also radiate into sector A6. Subscribers in sector A2 are three cell radii away from the Base Stations of sectors A7 and A1, and are four radii away than the Base Station of sector A2 such that their interference signals, will be significantly attenuated by the time they arrive at the sector A1, A7, or A6 Base Station antenna. Moreover, at these increased operating ranges it is expected that the propagation range loss is no longer a function of 20log(range), but rather a function of 40log(range), or 50log(range) so that the total attenuation is very significant and the received level of interference is negligible.

Now consider the radiation from the Base Station into the Subscriber antennas. Again recall that the Subscribers have their antennas pointed directly at their respective Base Stations, This being the case, again only a small number receive any interfering signal, i.e., a 3.8° degree segment in sector A2, will receive interference from the Base Stations in A1, A7, and A6. This segment is that segment of Subscribers whose antenna pattern encompasses both the Base Station in sector 2 as well as the Base Station in sector A1, A7, or A6. Once again this interference signal is significantly attenuated, first of all because it is three or four times farther away than its own Base Station and secondly because at this range the propagation loss is increasing much more rapidly as already explained and the received signal level will be insignificant.

Improved Hexagonal Pattern

Figure 5:
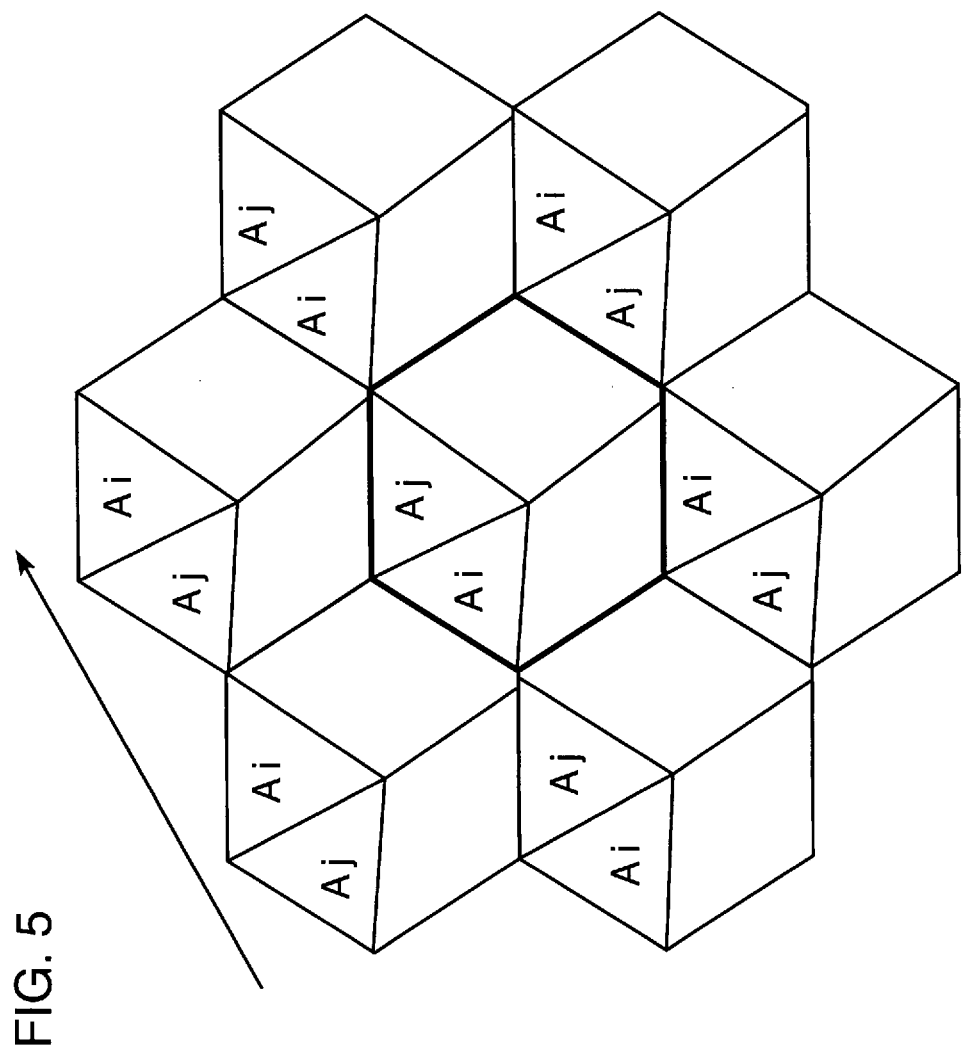
FIG. 5 is a typical hexagonal, seven cell, six sector, cellular system configuration incorporating the invention.

Even though the interference signal levels may be attenuated sufficiently in most cases, it is desirable to be able to have improved cellular system designs for improved adjacent cell isolation if necessary. This can be done by use of the cell arrangement illustrated in FIG. 5.

FIG. 5 again illustrates a hexagonal seven cell pattern with what appears to be a three sector pattern. In this case each of the original three sectors has been divided in half, as shown for the A sector such that there are now effectively six sectors. These half sectors are shown for the A sectors as Ai and Aj. Note that the placement of the Ai and Aj is the same for all cells along the diagonal following the arrow shown above the cellular pattern. The same pattern is followed in the third diagonal row, i.e., two rows below the first. However, in the second row the order of the A's is reversed. By this technique the system is now in fact a six sector pattern which eliminates any interference radiation from any Ai or AJ cell into another Ai or Aj. When any radiation does arrive from the previously offending adjacent sectors, it arrives at an angle which is significantly outside the 3 dB beam width of the receiving antenna.

Rectangular Cellular Structures

Figure 6A:
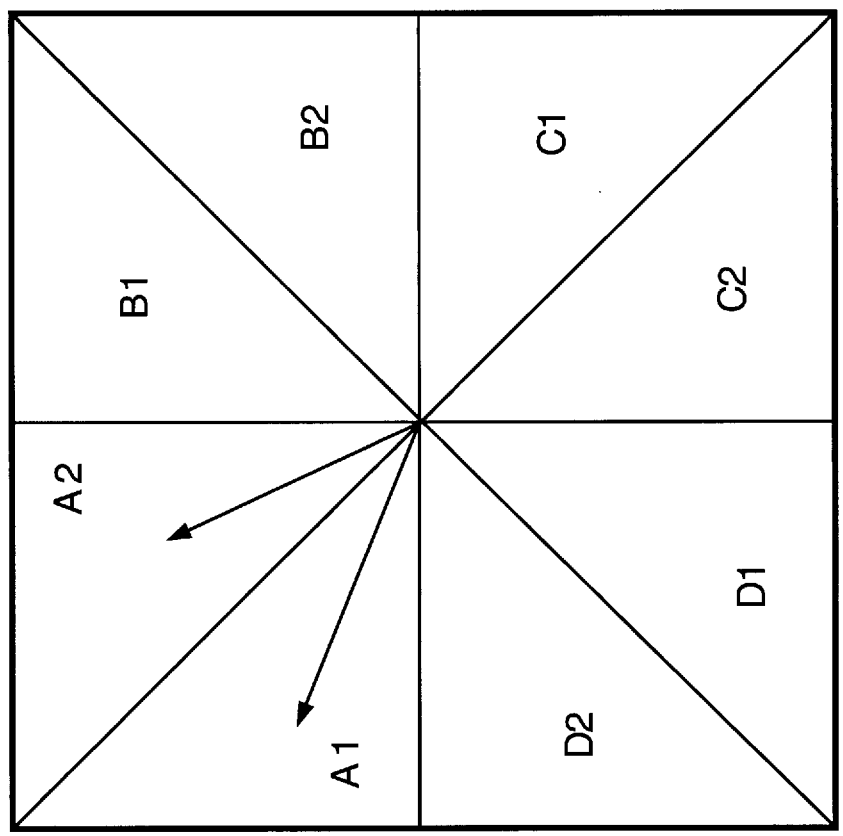
FIG. 6(a) is an illustration of a typical rectangular single, eight sector cellular system configuration
Figure 6B:
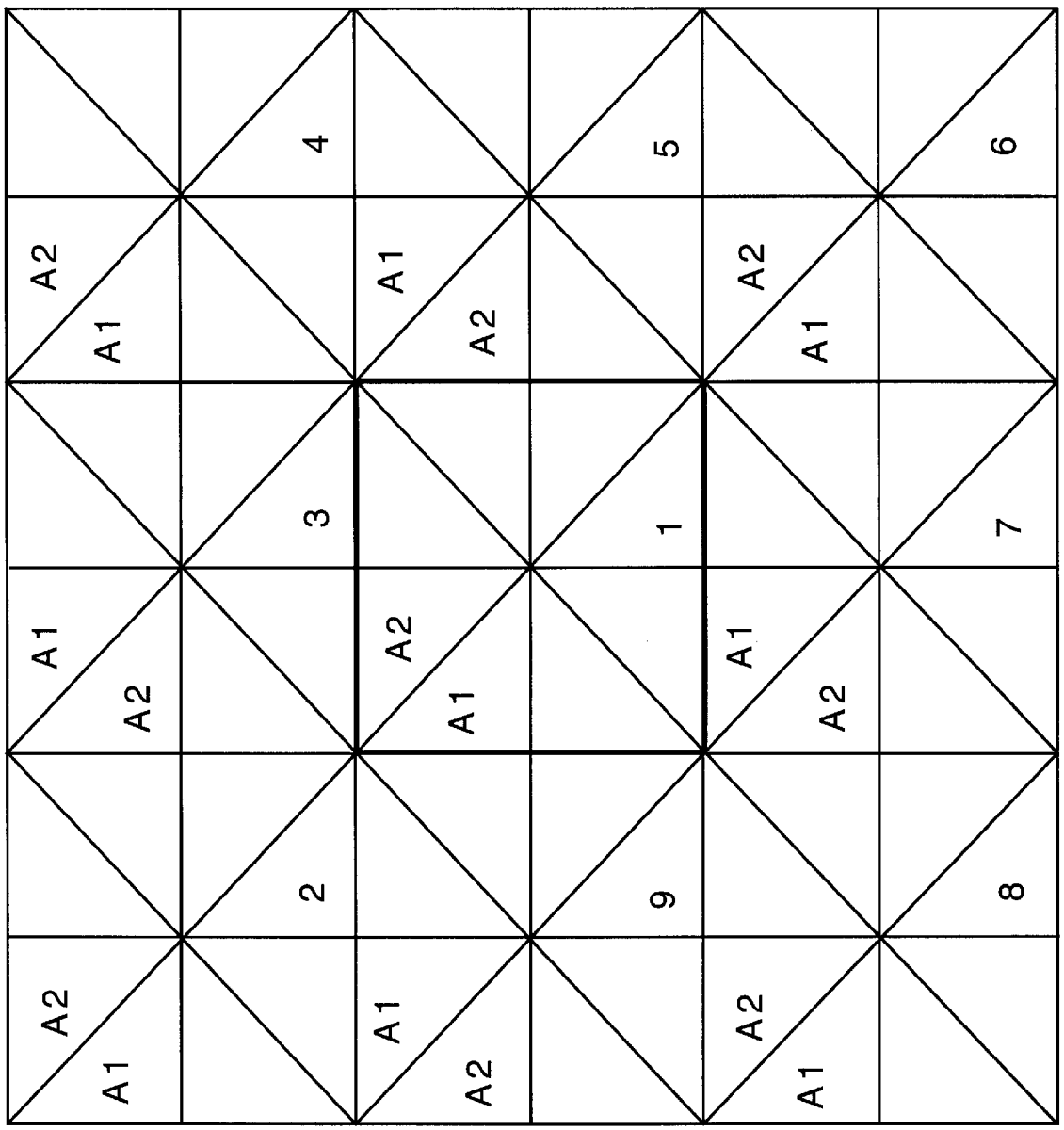
FIG. 6(b) is a n illustration of a typical rectangular, nine cell, eight sector cellular system configuration incorporating the invention.

An example of a single rectangular cellular system structures is given in FIG. 6(a), and expanded into a nine cell structure in FIG. 6(b). Recalling the description provided for the hexagonal cell structure shown in FIG. 2, it can be said that the description is the same, i.e., the center of the cell is the location of the Base Station. The Base Station transmits away from the center. The Subscribers in a given sector, e.g., sector Al aim their antennas directly at the location of the Base Station. Each of the eight sectors operate on different portions of the FCC allocated frequency bands. Note, however, that there are two of each letter designator. The reason for this is shown in FIG. 6(b). Note that the A's are reversed in their position in adjacent cells as was done in FIG. 5 with the hexagonal cell structure. The cells are identified by a number in the lower center of the cell. Note that in moving horizontally from cell 2 to 3 to 4, the sequence of A's reverses each time. Similarly in moving vertically from cell 2 to 9 to 8 the sequence of A's reverses. The reason for this is to provide the same conditions as in the hexagonal pattern, i.e., the Subscribers do not radiate directly into the 3 dB beam width of the Base Stations of immediately adjacent cells. Similarly Base Stations do not radiate into Subscriber antennas located in immediately adjacent cells. This minimizes the likelihood of adjacent cell interference until the range is at least three times larger than the normal range for operation within a cell.

Polarization Diversity Between Cells

Isolation between adjacent cells is of utmost importance so that transmissions intended for one set of subscribers, is not received by another set of subscribers. As noted by the preceding discussion, a significant degree of isolation can be provided by the appropriate design of the cell structure whether it be hexagonal or square. The use of antenna polarization diversity can help increase the isolation between adjacent cells and in addition it may increase the effective capacity of the total system. Considering the cellular pattern in FIGS. 4(a) and 4(b), if polarization diversity were used between adjacent diagonal rows of cells, a frequency reuse of one is achievable throughout the hexagonal system. Similarly, considering the cellular pattern in FIG. 6(b) and even assuming a four sector pattern rather than eight sector pattern, if polarization diversity were used between adjacent diagonal rows of cells, a frequency reuse of one is again achievable, in this case, throughout the rectangular system.

The factors limiting the usefulness of polarization diversity are, 1) the amount of cross polarization isolation which can be achieved by an antenna, 2) the degree to which rain may depolarize a signal, or the degree to which a cross polarized component may be created due to rain effects, and 3) the degree to which multipath may exist in the system and degrade the cross polarization isolation. It is known, for example, that horn antennas of the approximate gain required for the system Subscribers can provide at least 25 dB of cross polarization isolation. It is believed that cost effective designs can be achieved for the system in this respect. It can also be shown that at the system operating frequency band there will not be sufficient depolarization of the signal to degrade the system significantly, i.e., the resulting signal to interference ratio will not degrade below approximately 25 dB for 99.9% of the time in the rainiest areas of the United States, for example. Finally the multipath problem is circumvented by the fact that the Subscriber antennas have very narrow beam widths and can be expected to receive insignificant interference in the form of multipath signals. Similarly the Subscriber narrow beam transmission will generate minimal multipath signaling to the Base Station.

Increased Cell Sectorization and Use of Polarization Diversity Achieve 100% Frequency re-use of 1

The baseline system assumes a Subscriber population density of 1000 subscribers per 1 km radius cell. As the population density increases, the system must be designed to be able to accommodate the growth. It was shown that increased cell sectorization, e.g., from 4 to 8 for rectangular cells, and from 3 to 6 for hexagonal cells, improves the conditions of adjacent cell interference. Similarly it was shown that by use of polarization diversity a frequency re-use of 1 is achievable for both hexagonal and rectangular cell structures. Finally it was shown that by appropriate selection and assignment of the operating frequency bands, e.g., as shown by the use of the two bands for the A sectors labeled as Ai and Aj in FIG. 5 and FIG. 6(b), the adjacent cell interference was again reduced. All three techniques can be employed in the event of increased population density to achieve an increase in frequency re-use and thereby in effective total system subscriber capacity for these array configurations.

The above described techniques achieve the maximum capacity for the array configurations assumed. It is possible that such configurations may have to be used for reasons of topography or some other consideration. The array configurations described are not he optimal configurations for use in this system. Optimal configurations permit achievement of at least 200% system capacity and are described below.

Optimal Hexagonal Array

Figure 7:
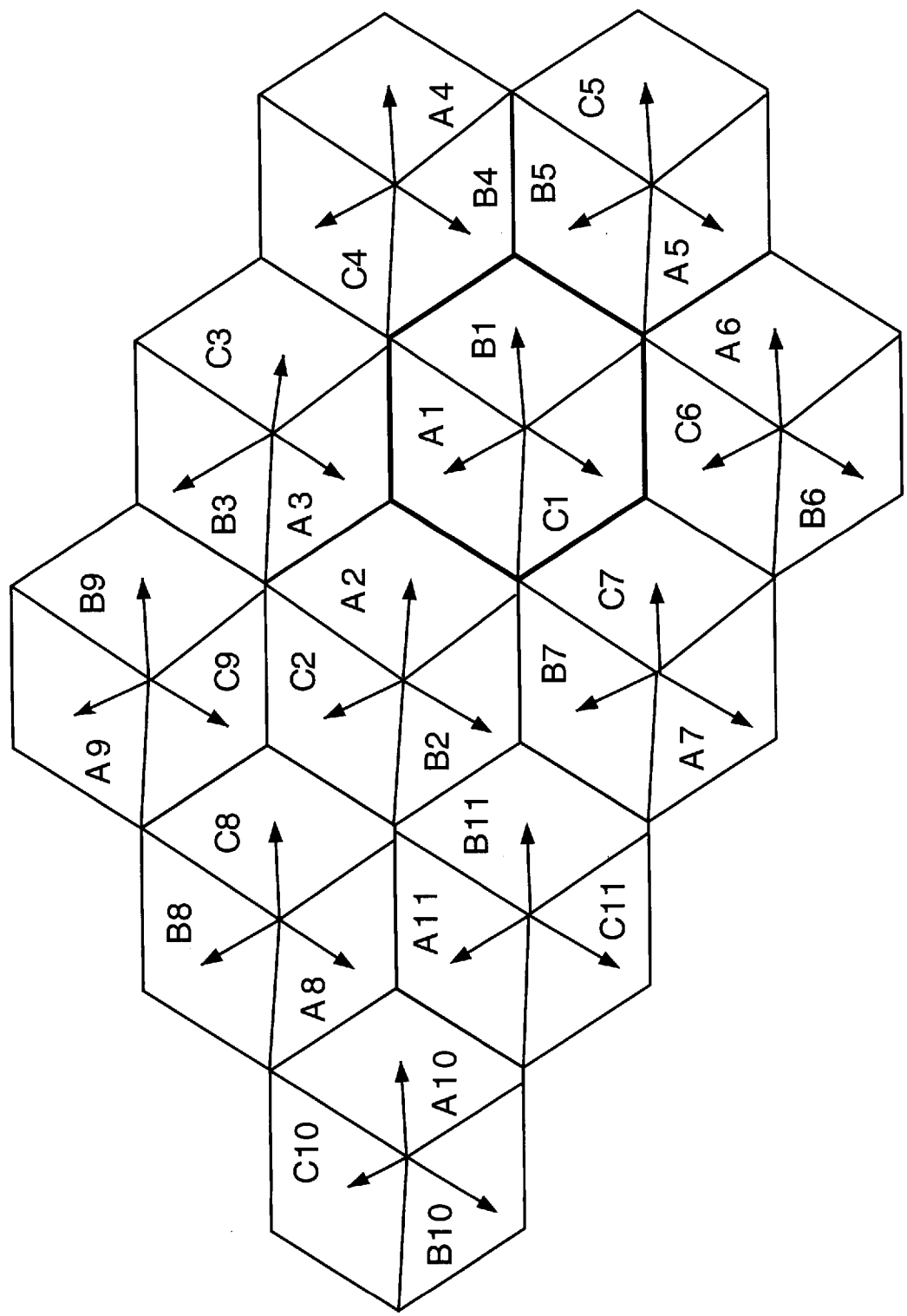
FIG. 7 illustrates one embodiment of an optimal hexagonal, three sector, cellular system with 100% frequency reuse, FIG. 8 Is an embodiment of an optimal rectangular, four sector, cellular system configuration with 100% frequency reuse.

An improved hexagonal array configuration is shown in FIG. 7. It is referred to here as the "optimal" array because it provides frequency re-use of 1 without the need for polarization diversity. This is advantageous because the system capacity can be increased by cell sectorization alone.

Note that in FIG. 7 the sector operating in the same frequency band but in adjacent cells are placed adjacent each other. Again, here, as before, the arrows indicate the direction of RF transmission from the Base Station. There will be no mutual interference between adjacent A sectors because the antennas of the Subscriber point to their respective Base Stations away from the Base Stations of the adjacent cells. Examining the direction of signal transmissions relative to A1 cell, there is no interferor until the sector A9 is reached.

Optimal Rectangular Array

Figure 8:
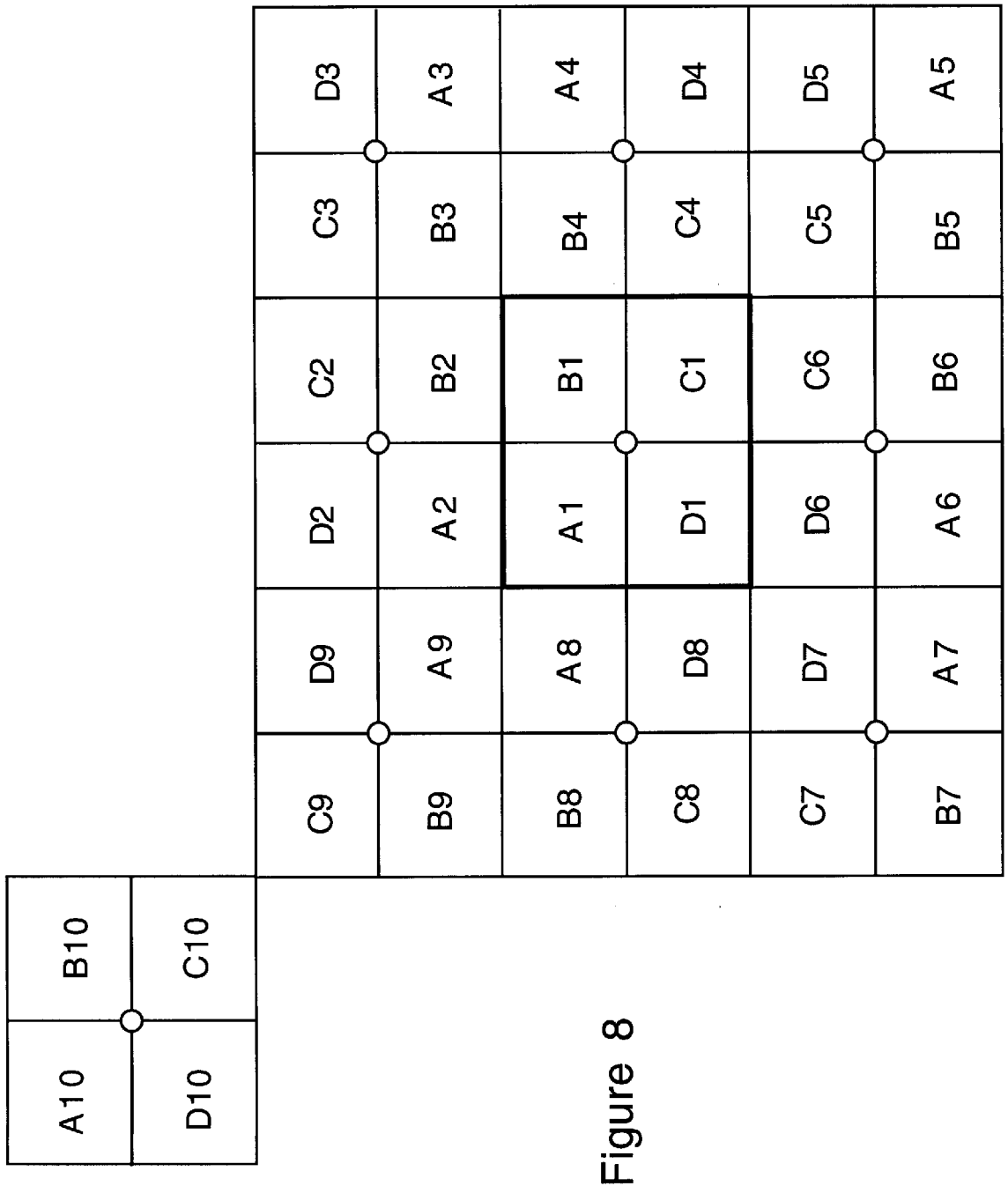

A similar "optimal" rectangular array is shown in FIG. 8. Again the optimality is defined here to mean that 100% frequency re-use of one is achieved without resorting to use of polarization diversity. Note here that the transmission arrows are deleted for clarity and the center of each cell, i.e., the location of the Base Stations is identified by a black dot. In this case the first source of interference to sector A1 is not reached until sector A10 which is five cell radii away which again guarantees that the received signal strength will be below any noticeable interference level at A1.

200% Capacity Optimal Rectangular Array

Figure 9:
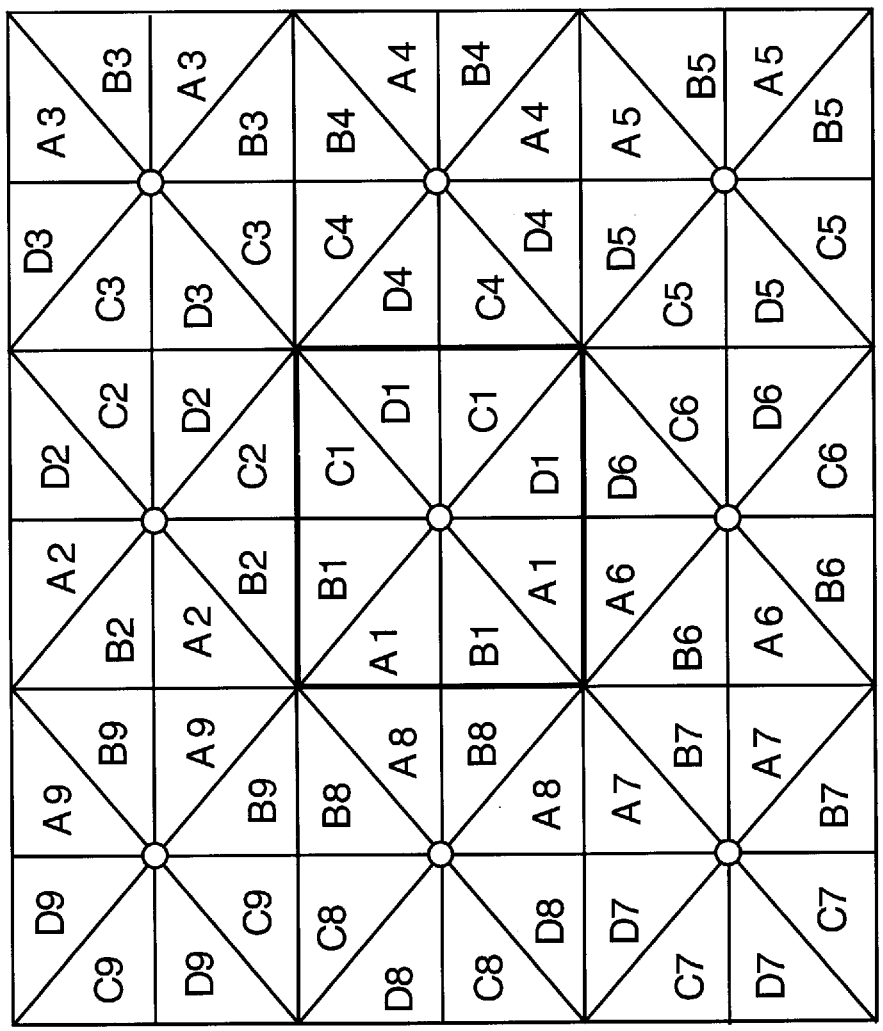
FIG. 9 illustrates one embodiment of an optimal rectangular, eight sector, cellular system configuration with 200% capacity.

As noted previously it is desired that the system be able to support growth should the population density increase and the number of Subscribers to be serviced in a given cell exceed capacity. Increased capacity can be achieved by modification of the optimal array patterns and increased sectorization. FIG. 9 illustrates an eight sector rectangular array pattern which achieves a 200% system capacity. Note that there are still only four frequency bands identified by the A<B<C< and D labels, but they are used twice per cell. This increases the capacity by a factor of two. Also note that the interference between adjacent cells is minimal, e.g., the lower sector A9 illuminating the lower sector A3. It is also noted that the system capacity can be further doubled by further sectorization and the use of polarization diversity.

200% Capacity Hexagonal Array

Figure 10:
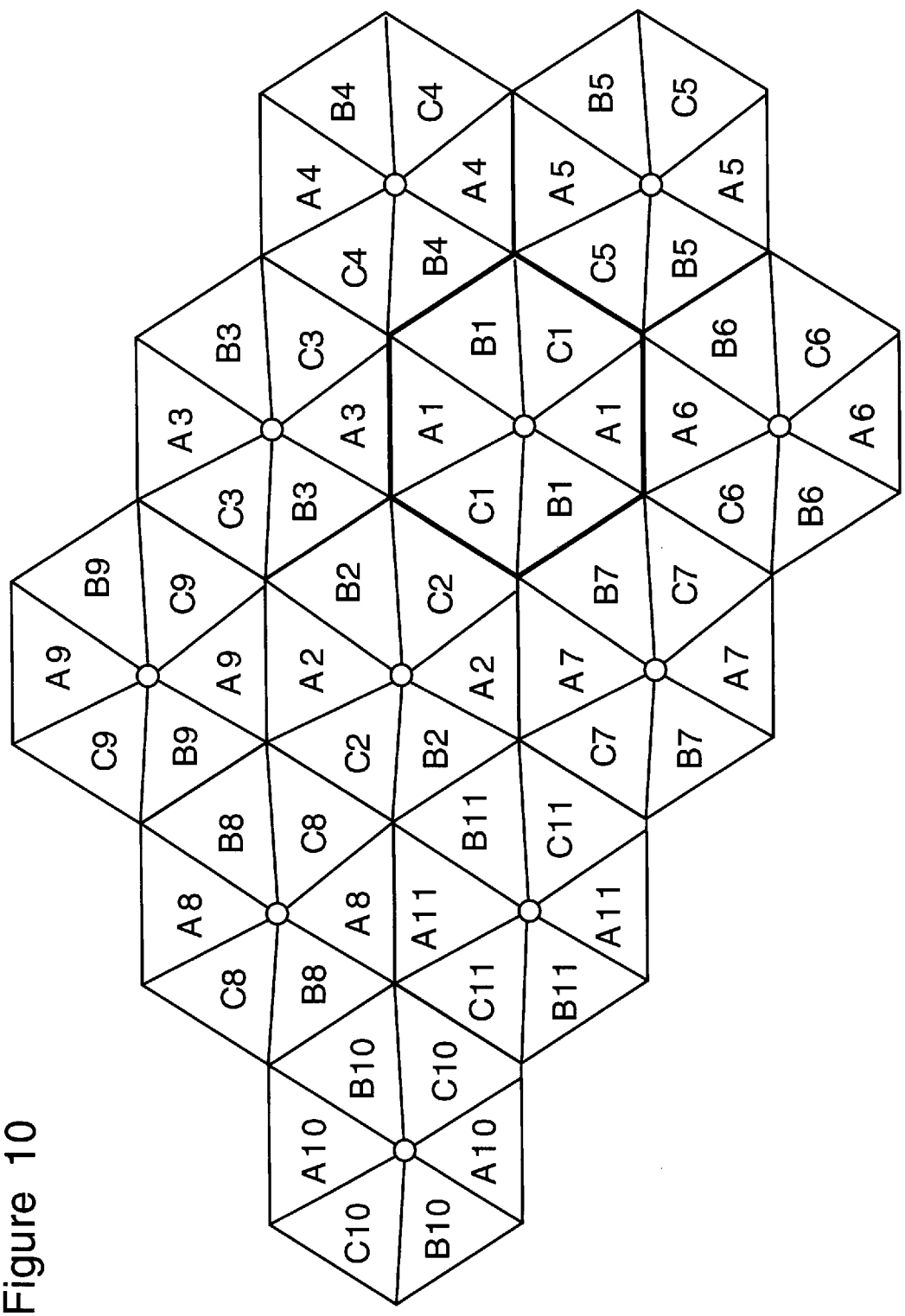
FIG. 10 illustrates an embodiment of an optimal hexagonal, six sector, cellular system configuration with 200% frequency reuse.

A similar optimal array can be developed for hexagonal arrays and is shown in FIG. 10. As for the rectangular array, the capacity is doubled because the three frequency bands are used twice in each cell. For the array shown, the distance to the first interfering sector is three cell radii away, e.g., sector C2 illuminating sector C1 on the far side of the adjacent cell. This may well be far enough such that there will be no noticeable interference. Should there be any interference the problem is solved by using polarization diversity in successive cells. Again, a further increase in capacity can be achieved by additional sectorization and the use of polarization diversity if found to be necessary to maintain interference at or below acceptable levels.

Operation With Satellite Link Signal Distribution to Remote Base Stations

Figure 11:
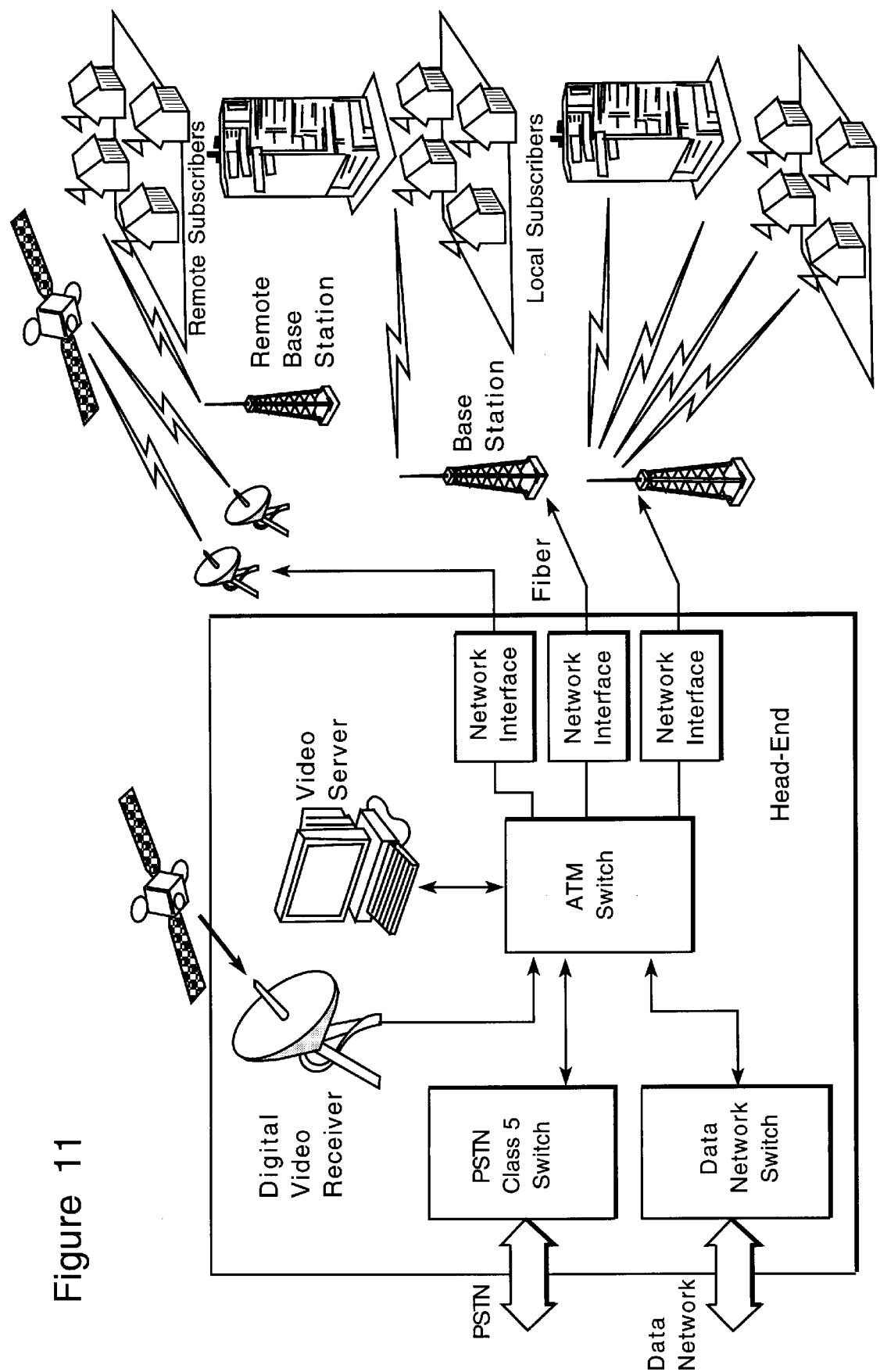
FIG. 11 is a local multipoint distribution system with a satellite link to geographically remote subscribers.

It will be the case that some cell locations may be geographically remote from other regions of well established LMDS cell distribution sites, When this is the case it may not be economically possible to connect to these remote cells by either fiber, coax, or line of sight communication links and it may be more economical to provide the remote connection via satellite. In this event it is planned to provide satellite links from the Head End to the remote Base Station(s). The satellite link will play exactly the same role that the Head End to Base Station fiber links play in the system configuration shown in FIG. 1. A system configuration for this option is illustrated in FIG. 11. This satellite link performs all the functions carried out by the fiber links to the other cells in the system. It may be the case that the satellite link will be of reduced capacity depending on economic considerations and on needs of the remote cell site(s).

This is four cell radii away which guarantees that the received signal strength will be well below any noticeable interference level at A1.

Typical System Frequency Plan

Figure 12A:
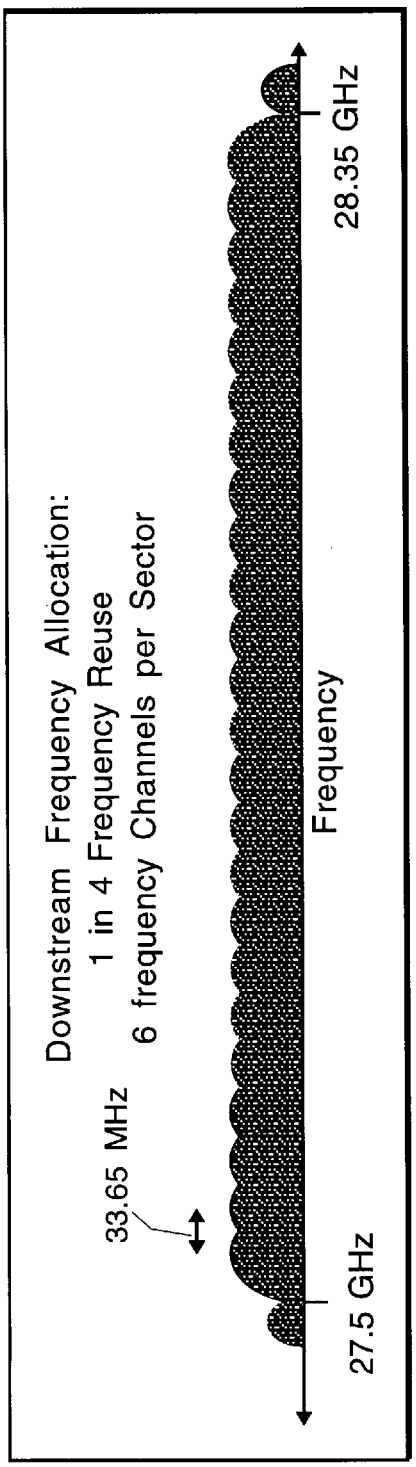
FIG. 12(a) is a typical LMDS frequency plan of the downstream frequency allocation, 1 in 4 frequency reuse, 6 frequency channels per sector.
Figure 12B:
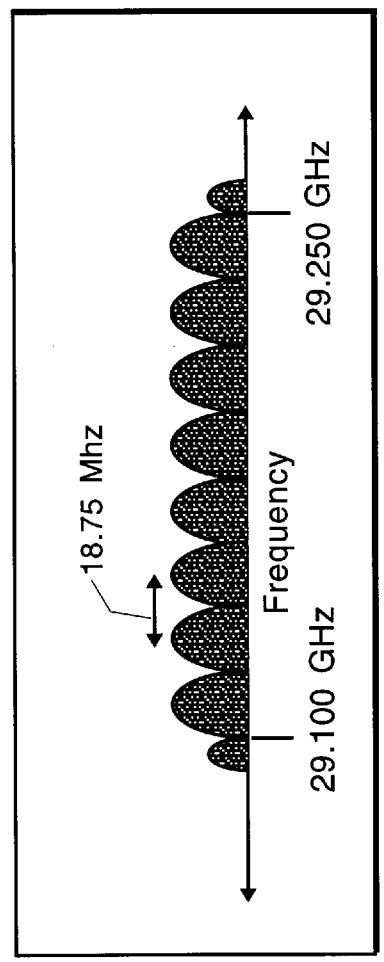
FIG. 12(b) is a typical LMDS frequency allocation, 2 channels per sector.

Typical system frequency plans are shown in FIGS. 12(a) and 12(b). FIG. 12(a) shows the frequency plan for the Down Stream signals, and FIG. 12(b) shows the frequency plan for the Up Stream signals. Recall that there are 850 MHz allocated for the Down Stream signals. As shown there are 24 Down Stream 67.3 Mbps QPSK carriers spaced at 33.65 MHz intervals. Recall that the basic payload data rate is 51.84 Mbps with rate 7/8 convolutional coding concatenated with (60,54) Reed Solomon coding. In this case since all signals originate at the Base Station and they are mutually synchronous, they can be spaced at orthogonal frequency steps equal to 1/T where T is the transmitted symbol period.

The Up Stream QPSK signals are spaced at frequency steps of 18.75 MHz. These carry a transmitted payload data rate of 28.8 Mbps. These signals cannot be assumed to be mutually synchronous and will therefore not be overlapped. In this case the adjacent bands will lie next to each other as shown in FIG. 12(b).

Subscriber Frequency Stability Considerations and Frequency Control

It is the intent to implement the most economical hardware configuration while satisfying fully all system performance requirements. As a part of this the system must be able to be deployed easily and quickly, and transmitted signals must be acquired and re-acquired rapidly should loss of signal occur momentarily. In order that this be possible, system signal frequency uncertainties must be controlled. The Base Station will provide high stability precision oscillators whose frequency will be known to an accuracy of at least 1E-9, such that frequency uncertainty of the carrier is no more than a few Hertz. Such oscillators are relatively costly and can not be provided for the Subscribers terminals. What will be provided at the Subscriber terminals will be oscillators with stability on the order of 1E-5 to 1E-6, which provides a frequency uncertainty range of 29,000 Hz to 290,000 Hertz. Operation with such large frequency uncertainties does not allow rapid acquisition operations.

In order to circumvent this problem the Subscriber equipment will initiate operations in a receive mode only. It will acquire the precise and very stable Down Stream signal, track it with a phase-lock loop, and synchronize all its signals to it. The Subscriber equipment will then measure the error it perceives to exist in the received Head End signal and assume that the error in fact lies within its own hardware frequency reference. The transmitted Subscriber signal frequency will be corrected by the amount measured in the received Head End signal. The Subscriber will then initiate transmission operations with a transmit signal which may have a small frequency error but which will be as stable as the received Head End carrier. If an error of any significance remains it will be measured by the Head End and a correction signal transmitted to the Subscriber during the network entry operations to be described below. Thus, the possibility of a Subscriber coming on the air with a large frequency error will not be possible.

Down Stream TDMA Signaling Frame Structure

Figure 13:
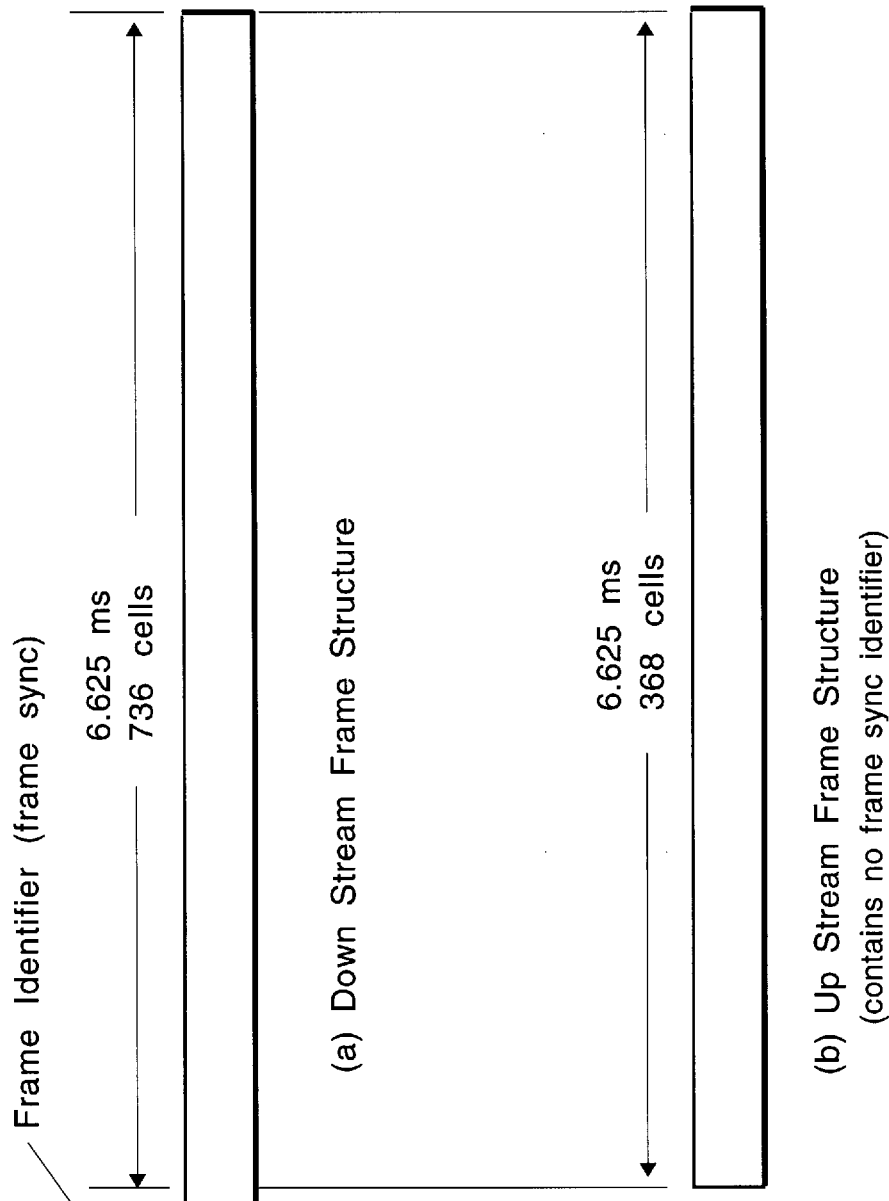
FIG. 13(a) is a typical signalling frame structure for down stream frame and FIG. 13(b) is a typical signalling frame structure for the upstream frame.

Each time slot on the Down Stream will be equal to one ATM cell. Each Down Stream channel, or carrier, will have a total payload data rate of 52.2 Mbps. With the FEC coding over head this becomes 66.29 Mbps. The data transmission signals will have a frame structure with each cell (or frame slot) having a capacity equal to a 64 kbps voice or one DS-0 channel. This translates to 53.2 Mbps/(64 kbps+overhead) =736 cells per frame. Since each cell contains 53 bytes (or 424 bits) of the 64 kbps signal, the frame length will be 6.625 ms. The first cell in each frame will be the frame indicator, or frame sync cell. The frame structure for the Down Stream signals is shown in FIG. 13(a). Since all Down Stream data will be handled as ATM signals, the ATM cells from a given source will be transmitted consecutively, however, they may appear separated from each other in the transmitted bit stream intermingled with data from other sources.

Up Stream TDMA Signaling Frame Structure

Each Up Stream channel will have the throughput of one half an OC-1 channel. Including overhead bits the transmission rate will be 28.8 Mbps. The data transmission signals will have a frame structure with each cell (or frame slot) having a capacity equal to a 64 kbps voice or one DS-0 channels This translates to 28.8 Mbps/64 kbps+overhead)= 368 cells per frame. Since each cell contains 53 data bytes (or 424 bits), the frame length will be 6.625 ms. The first cell in each frame will be the frame indicator, or frame sync cell. The frames of the transmitted Up Stream signals will be synchronized to the frames of the received Down Stream signals, such that the transmitted Up Stream does not require a separate frame sync slot. The frame structure for the Down Stream signals is shown in FIG. 13(a). The data transmitted by the Subscribers will occur in assigned slots in a format to be described below.

UP Stream Data Frame Format

Figure 14:
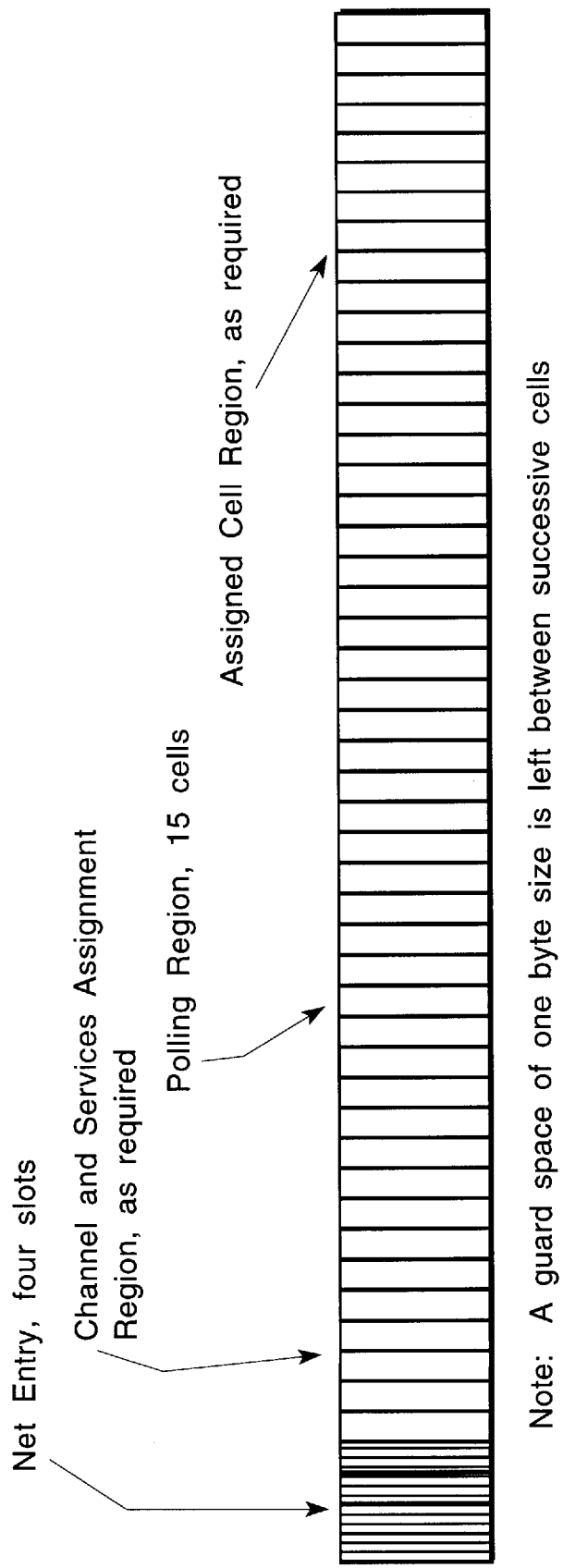
FIG. 14 is a typical upstream frame format.

As noted previously the Up Stream signal transmitted by each Subscriber will be synchronized to the Down Stream signal as received by the Subscriber and will therefore not require a separate frame sync slot. The frame format to be used in the Up Stream signals is shown in FIG. 14. The figure shows a single signal as it will occur on one channel. All channels will have the same format but will communicate with a different set of Subscribers, In a preferred embodiment, there are four "regions" in the overall frame. The regions are identified by the function performed by the cells comprising the region. The regions are as follows:

1) The net entry region consists of four consecutive cells and occurs at the beginning of the Up Stream frame. frame identifier, or frame sync cell.

2) The channel and services assignment region to which Subscribers are assigned immediately after completing operations in the net entry region occurs next.

3) The net polling region consisting of fifteen cells shown here occurring consecutively in the frame.

4) The assigned cell region consisting of however many cells are required to carry the Up Stream data from all the Subscribers operating on this channel.

The details of the operations are described below.

Net Entry, and Power, Timing and Frequency Control

When a Subscriber is first turned on and attempts to enter the system the Subscriber's frequency, timing, and power levels will not have been checked and adjusted. The Subscriber will measure the received Base Station signal power level and, knowing what it expects to receive as a function of range, it adjust its transmit level accordingly so that its signal will arrive at the Base Station at the proper power level. When the Subscribers' signal is received at the Base Station its level is measured and refinements are made as necessary. This is accomplished by the Base Station as follows. The Base station has a reference received power level stored in memory for each subscriber. When it receives the Subscriber signal it compares the signal level received to that stored in the memory. The difference is transmitted to the subscriber as a correction factor initially in the Net Entry region of the frame and later on in the Polling region of the frame as described below.

The Subscriber's frequency must be corrected. This is done in large part by the Subscriber equipment which locks on to the received Base Station signal, tracks it with a phase locked loop and synchronizes its system reference to it. Corrections to the Subscribers' frequency are communicated to the Subscriber in both the Net Entry and Polling regions of the frame.

The timing of the transmit signal must be set so that it arrives properly synchronized to the TDMA format to be received at the Base Station. A Subscriber close to the Base Station will have essentially zero delay in its return signal assuming that it initiates signal transmission in perfect synchronism with the received frame identifier signal received from the Base Station. A Subscriber at the farthest range, assumed here to be at least 2 km for the baseline microcellular system, but could conceivably be 10 km for a macrocellular system, will have a delay of approximately 13.44 microseconds and 61.2 microseconds respectively in its return signal assuming that it similarly initiates transmission in perfect synchronism with the received frame identifier signal from the Base Station. Each cell in the Up Stream frame is approximately 18 microseconds long. Thus, a net entry region four cells long provides a time slot 72 microseconds long which is sufficiently long to accommodate the maximum delays possible when the Subscribers transmit timing has not been adjusted.

When a Subscriber's equipment is first turned on it transmits with no adjustment to its timing, i.e., zero delay in transmission. As soon as the Base Station receives the new Subscriber signal it measures the timing offset with respect to the first second net entry cell in the frame, it compares the received signal power level with respect to a stored reference level, and it measures its frequency offset, if any. The Base Station immediately transmits correction data to the Subscriber for all three parameters, power level, frequency, and timing, and waits to receive a subsequent transmission to verify that the corrections were properly received and implemented. Once the corrections are verified the Subscriber is directed to transfer operations to the channel and services assignment region whose location is also identified to the Subscriber. All correction parameters are stored by the subscriber terminal for future use.

Channel and Services Assignment Region Operations

The size of the channel and services assignment region will be variable. It will consist of all the cells not needed by all the other regions but will not be allowed to be smaller than a size guaranteeing adequate service for the total population of Subscribers to be serviced by this channel. The exact minimum size will depend on the size of the Subscriber population.

When assigned to the channel and services assignment region the Subscriber's signal parameters have all been adjusted so that when received at the Base Station its signal will be in timing synchronism with respect to the Base Station frame structure, its frequency error, if any, has been corrected and its power level will be properly set. Once these operations have been completed the Subscriber is removed from further operation in the net entry region so as to make it available for other Subscribers entering the system, if necessary.

Operations in the channel and services assignment region consist of two types:

1) Establishment of the Subscribers capacity and service requirements, and assignment of operating cells in the assigned cell region. Upon conclusion of operations in the channel and services assignment region the Subscriber becomes an on-line Subscriber being provided a fixed portion of the channel capacity and system services as requested.

2) Issuance of additional requests for service by any of the on-line Subscribers if they cannot receive service from the polling operations to be described below.

Operations in the channel and services assignment region are in a slotted ALOHA fashion. The Subscribers proceed to access the channel as required in a slot they hope is vacant. Collisions may occur at which time the Subscribers repeat the transmission with a random length delay.

The function to be accomplished by operations in the channel and services assignment region are for the Subscriber to define for the Base Station the services it requires. The Base Station will then review the operational system conditions and define to the Subscriber which slots, or cells, it is to occupy in the assigned cell region of the frame so long as it continues to utilize the services requested. Once the issuance of cell assignment instruction is completed the Subscriber transfers operations to the assigned cell region as directed by the Base Station. Thereafter, operation in the channel and services assignment region will only be made use of by a Subscriber in emergency or priority situations which may arise and which cannot be serviced rapidly enough by the polling operations as described below.

Assigned Cell Region

The assigned cell region is that portion of the frame carrying the on-line services data from the Subscriber to the Base Station. The Subscriber will be assigned a channel capacity, i.e., a number of cells, sufficient to accommodate the data to be communicated in a timely manner. The cells to be occupied are precisely defined so that a Subscriber has the capacity needed in an exact location reserved for his use only until the service is no longer needed at which time it is relinquished for use by other Subscribers.

Net Polling Region

The net polling region serves two purposes: it provides a means of accessing off-line Subscribers and requesting a response for low rate monitoring and health check purposes, and it provides a means whereby the Base Station checks to see if a Subscriber requires servicing at that particular time.

It is expected that a cell will service on the order of 1000 Subscribers. This implies an average of 167 Subscribers to be serviced by each Up Stream channel. With 15 cells assigned to perform cyclic polling of all Subscribers, whether on-line or off-line, this translates to a check of 15 Subscribers every frame (6.625 ms), or a check of every Subscriber once every 74 Ms. This is adequate for purposes of such operations of monitoring utility power meters, security alarm systems, and hardware health check operations. It may not be sufficiently fast to keep up with the stream of service requests which will be generated be the Subscribers when demanding changes of service conditions while using a computer connection or controlling operating conditions of a television selection being viewed. In this event use will be made of the channel and services assignment region for communicating these service requests.

Control and Data Messages

All functions including MAC functions will be controlled by a series of control messages which are exchanged between the Head End and the Subscribers. All control messages flow through the Base Stations but in general all decisions will be made by the Head End. The detailed distribution of channel capacity as it relates to the physical channel occurs at the Base Station.

Some of the message types to be used are illustrated in FIG. 15.

Upstream Message Content

The Up Stream message contains a number of fields. The exact content varies depending on the type of message. All messages must contain certain standard characterization fields as follows:

Destination address—a unique N (e.g., 48) bit address identifying the Head End

Source Address—a unique N (e.g., 48) bit address identifying the Subscriber

Message Type—a N (e.g., 12) bit number identifying the message type.

Down Stream Message Content

The Down Stream Message similarly contains a number of fields. The exact content varies depending on the type of message. All messages must contain certain standard characterization fields as follows:

Destination Address—a unique N (e.g., 48) bit address identifying the Subscriber Source Address—a unique N (e.g., 48) bit address identifying the Head End Subscriber ID#—a temporary identification number assigned to the subscriber for the duration of the presently established service session. This ID# need only be used if the Head End capacity is expected to be less than the total number of Subscriber services to be provided at any one time by the Head End. If this is never to be the case, the Destination Address is adequate for all purposes.

Message Type—a N (e.g., 12) bit number identifying the message type.

FIG. illustrates several typical complete message structures. The size of tea various segments is shown in terms of bytes.

The simplest shown is FIG. 16(a) which illustrates the basic requirements for an Up Stream message. The configuration shown is adequate for use as either an Initiation Request message or a Terminate Request message. It can also be used for executing such functions as Request to Execute File Transfer by adding the details of what is to be transferred in the successive undefined cells of the message.

The next simplest message format is that shown in FIG. 16(b) which can be used for a Terminate Command from the Head End following a Termination request from a Subscriber. It can also be used for executing such functions as a Command to Prepare to Receive a File Transfer by adding the details of what is to be transferred in the successive undefined cells of the message.

An Initiation Response message becomes more complex and can take the form of FIG. 16(d). Note that FIG. 16(d) contains the Subscriber ID# and a parameter adjustment data. This type adjustment data would be provided to a new Subscriber in order to provide correct power level, carrier frequency, and signal transmit timing adjustments to ensure proper system operation and minimal interference between received Subscriber signals at the Head End. This message format can also be used for polling operations as a Status Request and a Parameter Adjustment Command. The message type would be changed to indicate that two functions are being performed, i.e., parameter adjustment data is being provided and a status data is requested from the Subscriber. Additionally, this general format is to be used as a Service Request Response by again changing the message type designator to indicate the appropriate two functions being performed and by appending to the message a definition of the services being allocated to the Subscriber.

FIG. 16(c) shows a typical format for a Subscriber Service Request message. Since more than one type of service might be requested at any one time, multiple simultaneous service request may be issued in a single message as shown.

Control Messages

All functions including MAC functions will be controlled by a series of control messages which are exchanged between the Head End and the Subscribers. All control messages flow through the Base Stations but in general all decisions will be made by the Head End. The detailed distribution of channel capacity as it relates to the physical channel occurs at the Base Station.

Figure 18:
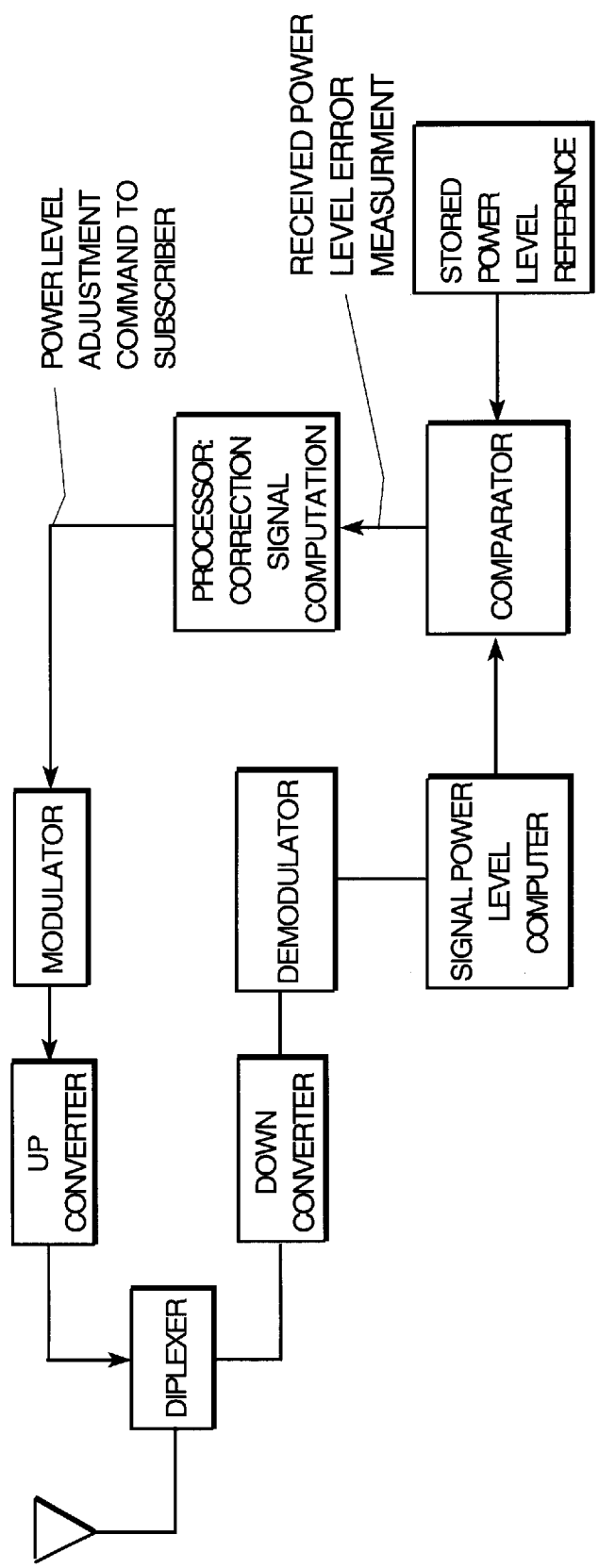
FIG. 18 is a block diagram illustrating Subscriber power level adjustment command generation at the Base Station.
Figure 21:
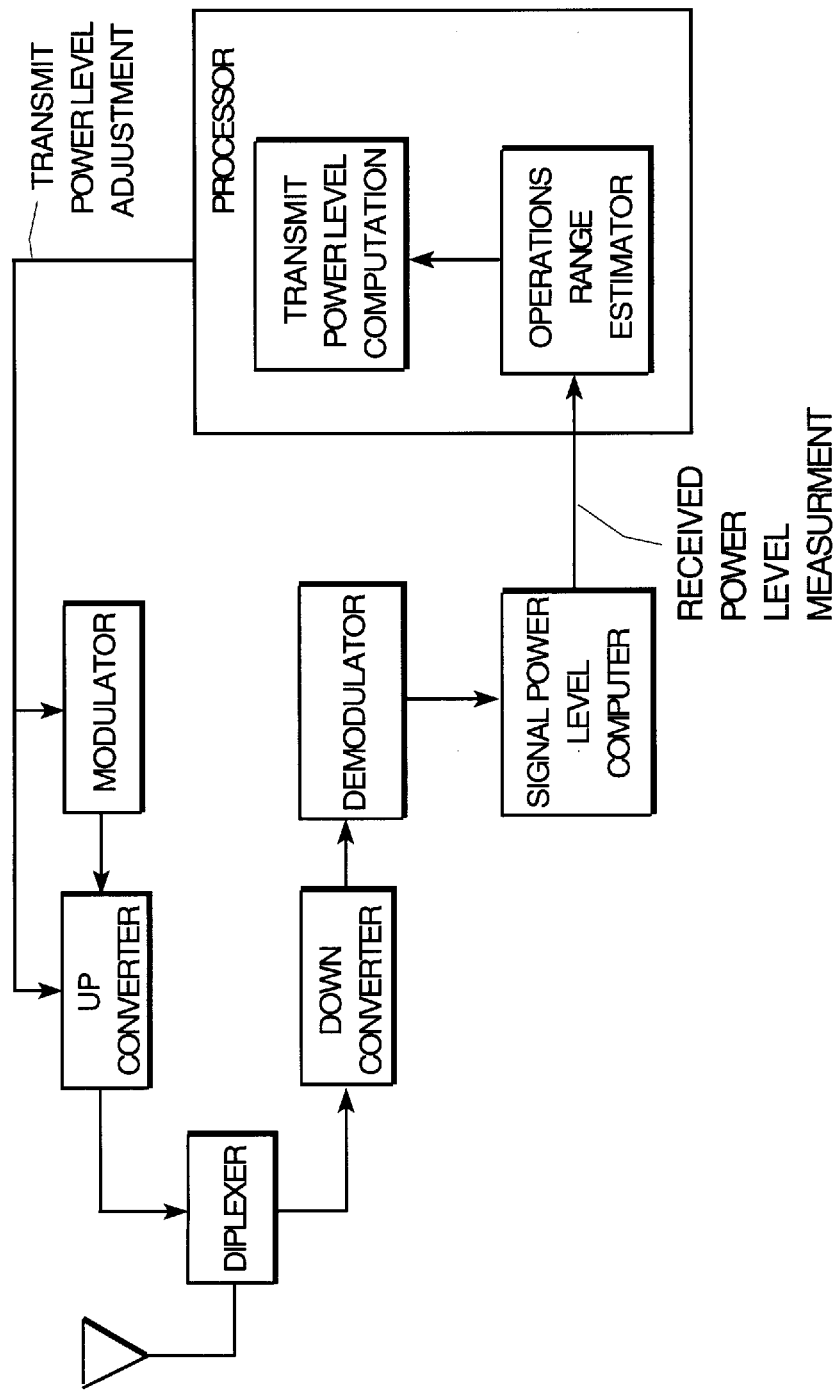
FIG. 21 is a block diagram illustrating Subscriber transmit power level adjustment operations at the Subscriber terminal.

Some of the message types to be used include the following:

1) Initialization request
2) Initialization response
3) Terminate request
4) Terminate command
5) Special commands FIG. 18 and FIG. 21 Power Level Adjustment The Subscriber power level is adjusted in two steps. FIG. 18 and FIG. 21 indicate the system level details of the operation as it is performed at the Subscriber and Base Station respectively.

During net entry operations the Subscriber receives the Base Station signal while operating in a receive only mode. The Base Station always operates at a fixed transmit power level. Following FIG. 18, the Subscriber receiving system receives and measures the Base Station power level. Based on this measurement, and knowing the transmit power level of the Base Station, the Subscriber system can estimate the range to the Base Station. Knowing the range to the Base Station, the Subscriber system can estimate the proper transmit power level at which it should operate. The Subscriber system sets the transmit power level to this estimated power level and initiates transmit operations.

Once the Subscriber begins Net Entry transmit operations the Base Station, following FIG. 21 immediately performs a signal level computation on the received Subscriber signal. It then compares the received power level to a stored reference level in a comparator circuit. The comparator provides a power level error measurement which is provided to a processor circuit (which may take the form of a microprocessor or a look up table) which provides a correction signal to be relayed to the Subscriber. The processor circuit assembles a power level adjustment command and relays it to the Subscriber. The Base Station periodically continues to perform a power level measurement and correction during the polling operations as required so long as the Subscriber is in transmit operation.

Figure 17:
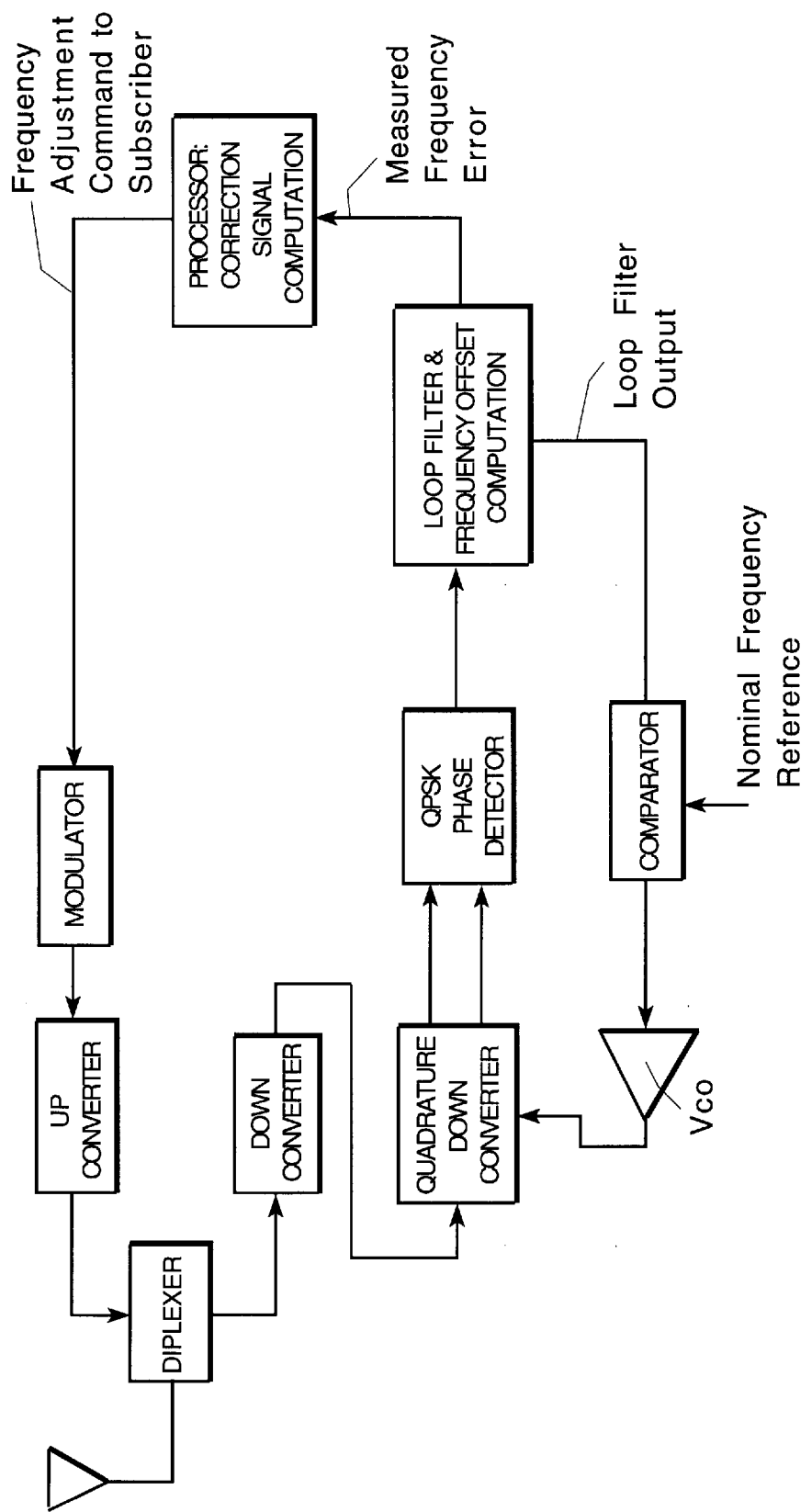
FIG. 17 is a block diagram illustrating the Subscriber frequency adjustment command generation at the Base Stations.
Figure 20:
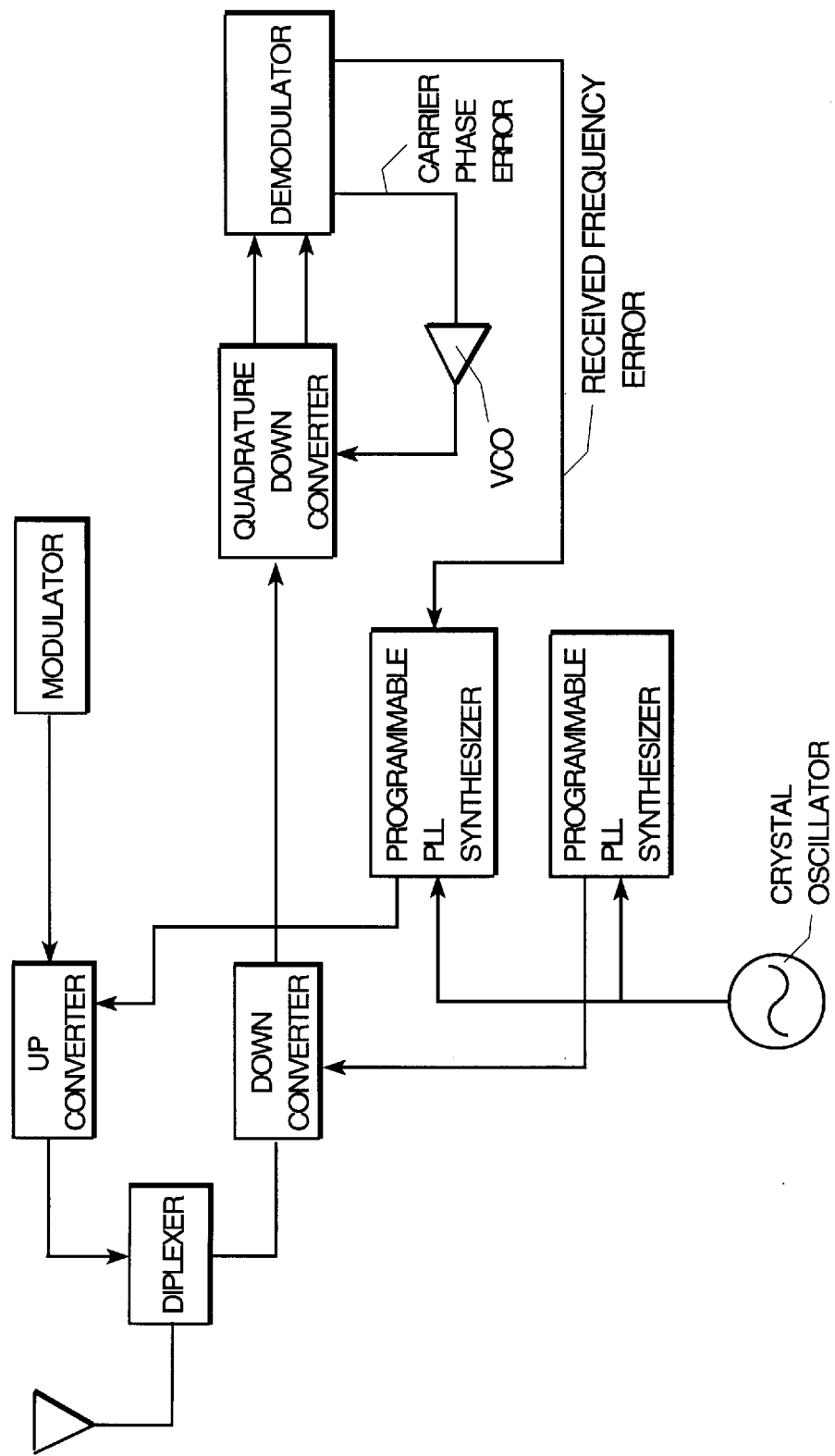
FIG. 20 is a block diagram illustrating Subscriber frequency tracking and correction operations at Subscriber terminals.

FIG. 20 and FIG. 17: Subscriber Frequency Adjustment Operations

The Subscriber carrier frequency is adjusted in two steps. FIG. 20 and FIG. 17 indicate the system level details of the operation as it is performed at the Subscriber and Base Station respectively.

During net entry operations the Subscriber receives the Base Station signal while operating in a receive only mode. The Subscriber receiving system contains a low cost oscillator whose frequency accuracy will be on the order of 1E-5 or 1E-6. The frequency error can be quite large with this stability oscillator. Both the receive and transmit programmable phase lock loop (PLL) synthesizers are initial locked only to this crystal oscillator. The Base Station always operates at a fixed and very stable carrier frequency, with a stability on the order of 1E-9. Following FIG. 20 the Subscriber receiving system receives and tracks the Base Station carrier frequency with a PLL and synchronizes its transmit system frequencies and transmit programmable PLL synthesizer to the received Base Station carrier signal. A comparison is made between the received frequency as seen by the Subscriber receive system and that frequency which is expected. It is assumed that the total error as seen by the Subscriber system is due to an error in the Subscriber crystal oscillator frequency. An error signal is generated on the basis of this assumption and a correction signal applied to the transmit programmable PLL synthesizers. This correction signal places the transmit frequency at the correct transmit frequency when correcting for the Subscriber system error. Transmit operations and Net Entry can now be initiated.

FIG. W operations are now initiated. The Base Station receives the subscriber signal as adjusted by the Subscriber system. There may still be an error which can develop over time due to temperature changes or changes in component values due to aging.

The receive Subscriber signal as tracked in a PLL and an error signal is generated on the basis of the PLL tracking operations. All received frequencies are compared to the Base Station frequency system as a standard. This measured frequency error is translated by the Base Station into a correction signal and transmitted to the Subscriber as a frequency adjustment command. The Base Station periodically continues to perform a carrier frequency measurement and correction during the polling operations as required so long as the Subscriber is in transmit operation.

Figure 19:
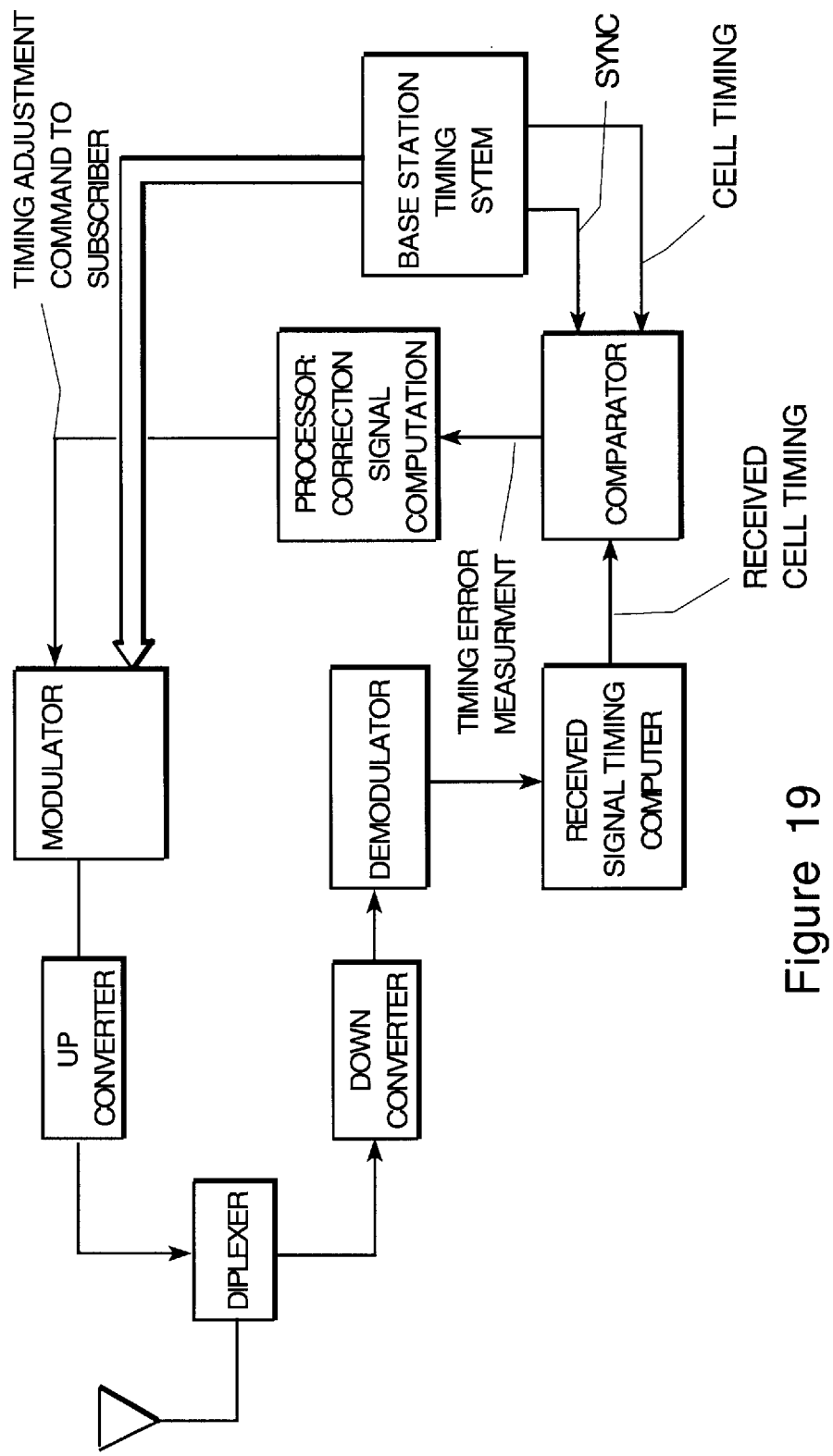
FIG. 19 is a block diagram illustrating Subscriber timing signal adjustment command generation at the Base Stations.

FIG. 19 Subscriber Timing Adjustment Operations

The Subscriber signal timing is adjusted by the Base Station. FIG. 19 indicates the system level details of the operation as it is performed by Base Station.

During net entry operations the Subscriber receives the Base Station signal while operating in a receive only mode. The Subscriber acquires the Base Station frame sync signal. The signal delay as seen at the Base Station will depend on the range to the Base Station from the Subscriber. During Net Entry operations the Base Station received the Subscriber signals compares the received time of arrival to an expected time of arrival (in this case the frame sync time) measures the delay, and derives a timing error measurement.

Based on this delay, or timing error measurement, the Base Station computes a signal timing correction adjustment command for the Subscriber. This command is communicated to the Subscriber whose system timing is adjusted on the basis of this instruction. Additional measurements and corrections are made during the Net Entry operations as required until the timing is adequately adjusted to allow the Subscriber to proceed to the Channel and Services Assignment region. The Base Station periodically continues to perform a Subscriber signal timing measurement and correction during the polling operations as required so long as the Subscriber is in transmit operation. It should be noted that timing error measurements at all times after net entry is complete are made on the basis of cell timing rather than frame sync since the Subscribers do not transmit frame sync signals and only transmit cells. The Base Station can compare all received signals, after initial adjustment are made, to cell timing since all transmissions are to be made in synchronism with cell slots.

While preferred embodiments of the invention have been shown and described, it will be appreciated that various other embodiments, adaptations and modifications coming within the scope of the invention will be apparent to those skilled in the art.

What is claimed is:

1. A local multipoint distribution system comprising:
   a head end coupled to a plurality of base stations, each base station constituting a cell,
   each base station having a plurality of sector beam antennas,
   each sector beam antenna illuminating a predetermined sector of said cell with RF communication signals,
   a plurality of RF subscriber stations for each sector of a cell, each subscriber station having a high gain antenna with a narrow beam width oriented toward the sector beam antenna oriented toward its assigned sector, time division multiple access control means at each subscriber station operated such that each subscriber transmits at a time different from the other subscribers in its sector so the subscribers in a given sector do not interfere with each others transmissions, respectively,
   means controlling the transmitted power level such that all subscriber signals arrive at their respective base stations at about the same power level,
   means controlling the transmit signal timing such that all subscriber signals arrive at their respective base stations at the exclusively assigned time thereby minimizing the possibilities of mutual interference and means controlling the transmit signal frequency such that all subscriber signals operate at their proper assigned frequency and are orthogonal to all other carrier frequencies received by the base station, and wherein
   each subscriber station first, in order to initiate operation, is operated in a receive-mode only to detect a stable downstream frequency from a head end signal and detect any received frequency error and adjust its initial frequency of operation in accordance therewith.

2. A local multipoint distribution system comprising:
   a head end coupled to a plurality of base stations, each base station constituting a cell,
   each base station having a plurality of sector beam antennas,
   each sector beam antenna illuminating a predetermined sector of said cell with RF communication signals, a plurality of RF subscriber stations for each sector of a cell,
   each subscriber station having a high gain antenna with a narrow beam width oriented toward the sector beam antenna oriented toward its assigned sector,
   time division multiple access control means at each subscriber station operated such that each subscriber transmits at a time different from the other subscribers in its sector so the subscribers in a given sector do not interfere with each others transmissions, respectively, and
   means controlling the transmitted power level such that all subscriber signals arrive at their respective base stations at about the same power level
   wherein each subscriber station first, in order to initiate operation, is operated in the receive mode only to detect a stable downstream frequency from a head end signal, and detect any received frequency error and adjust its initial frequency of operation in accordance therewith.

3. The local multipoint distribution system defined in claim 2 wherein said cells are hexagonally shaped and said sectors are arranged such that the subscribers do not radiate directly into the three db beam width of base stations of immediately adjacent cells.

4. The local multipoint distribution system defined in claim 2 wherein said cells are rectangularly shaped and the sectors of said cells are arranged such that the subscribers do not radiate directly into the three db beam width of base stations of immediately adjacent cells.

5. The local multipoint distribution system defined in claim 2 wherein each said subscriber station includes means to measure the power level from the base station, and means for comparing the power level from the base station with a reference and adjusting the power at which said subscriber station transmits in accordance therewith.

* * * * *